US008831381B2

(12) United States Patent
Baheti et al.

(10) Patent No.: US 8,831,381 B2
(45) Date of Patent: Sep. 9, 2014

(54) DETECTING AND CORRECTING SKEW IN REGIONS OF TEXT IN NATURAL IMAGES

(71) Applicant: QUALCOMM Incorporated, San Diego, CA (US)

(72) Inventors: Pawan Kumar Baheti, Bangalore (IN); Ankit Agarwal, New Delhi (IN); Dhananjay Ashok Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 13/748,562

(22) Filed: Jan. 23, 2013

(65) Prior Publication Data

US 2013/0195376 A1    Aug. 1, 2013

Related U.S. Application Data

(60) Provisional application No. 61/590,966, filed on Jan. 26, 2012, provisional application No. 61/590,983, filed on Jan. 26, 2012, provisional application No. 61/590,973, filed on Jan. 26, 2012, provisional application No. 61/673,703, filed on Jul. 19, 2012.

(51) Int. Cl.
*G06K 9/36* (2006.01)
*G06T 11/60* (2006.01)
*G06K 9/32* (2006.01)
*G06K 9/00* (2006.01)

(52) U.S. Cl.
CPC ............ *G06K 9/00456* (2013.01); *G06T 11/60* (2013.01); *G06K 9/3258* (2013.01); *G06K 9/36* (2013.01)
USPC ........................................................ 382/289

(58) Field of Classification Search
None
See application file for complete search history.

(56) References Cited

U.S. PATENT DOCUMENTS 3,710,321 A    1/1973  Rubenstein
4,654,875 A    3/1987  Srihari et al.
(Continued)

FOREIGN PATENT DOCUMENTS

EP    1146478 A2    10/2001
EP    1840798       10/2007
(Continued)

OTHER PUBLICATIONS

Chaudhuri, B.B. et al. "Skew Angle Detection of Digitized Indian Script Documents", IEEE Transactions on Pattern Analysis and Machine Intelligence, vol. 19, No. 2, Feb. 1997, pp. 182-186.

(Continued)

*Primary Examiner* — Li Liu
(74) *Attorney, Agent, or Firm* — Silicon Valley Patent Group LLP

(57) ABSTRACT

An electronic device and method use a camera to capture an image of an environment outside the electronic device followed by identification of regions, based on pixel intensities in the image. At least one processor automatically computes multiple values of an indicator of skew in multiple regions in the image respectively. The multiple values are specific to the multiple regions, and thereafter used to determine whether unacceptable skew is present across the regions, e.g. globally in the image as a whole. When skew is determined to be unacceptable, user input is requested to correct the skew, e.g. by displaying on a screen, a symbol and receiving user input (e.g. by rotating an area of touch or rotating the electronic device) to align a direction of the symbol with a direction of the image, and then the process may repeat (e.g. capture image, detect skew, and if necessary request user input).

19 Claims, 16 Drawing Sheets

(56) References Cited

U.S. PATENT DOCUMENTS

| | | | |
|---|---|---|---|
| 5,321,768 A | 6/1994 | Fenrich et al. | |
| 5,459,739 A | 10/1995 | Handley et al. | |
| 5,519,786 A | 5/1996 | Courtney et al. | |
| 5,633,954 A | 5/1997 | Gupta et al. | |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,393,443 B1 | 5/2002 | Rubin et al. | |
| 6,473,517 B1 | 10/2002 | Tyan et al. | |
| 6,674,919 B1* | 1/2004 | Ma et al. | 382/289 |
| 6,678,415 B1 | 1/2004 | Popat et al. | |
| 6,687,421 B1* | 2/2004 | Navon | 382/289 |
| 6,738,512 B1 | 5/2004 | Chen et al. | |
| 7,263,223 B2 | 8/2007 | Irwin | |
| 7,333,676 B2 | 2/2008 | Myers et al. | |
| 7,403,661 B2 | 7/2008 | Curry et al. | |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 2003/0026482 A1* | 2/2003 | Dance | 382/199 |
| 2003/0099395 A1* | 5/2003 | Wang et al. | 382/165 |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0215231 A1* | 9/2006 | Borrey et al. | 358/448 |
| 2006/0291692 A1 | 12/2006 | Nakao et al. | |
| 2007/0110322 A1 | 5/2007 | Yuille et al. | |
| 2007/0116360 A1 | 5/2007 | Jung et al. | |
| 2008/0008386 A1 | 1/2008 | Anisimovich et al. | |
| 2008/0112614 A1 | 5/2008 | Fluck et al. | |
| 2009/0202152 A1 | 8/2009 | Takebe et al. | |
| 2009/0232358 A1 | 9/2009 | Cross | |
| 2009/0252437 A1 | 10/2009 | Li et al. | |
| 2009/0316991 A1 | 12/2009 | Geva et al. | |
| 2009/0317003 A1 | 12/2009 | Heilper et al. | |
| 2010/0049711 A1 | 2/2010 | Singh et al. | |
| 2010/0067826 A1 | 3/2010 | Honsinger et al. | |
| 2010/0080462 A1 | 4/2010 | Miljanic et al. | |
| 2010/0128131 A1* | 5/2010 | Tenchio et al. | 348/207.1 |
| 2010/0141788 A1 | 6/2010 | Hwang et al. | |
| 2010/0144291 A1 | 6/2010 | Stylianou et al. | |
| 2010/0172575 A1* | 7/2010 | Lukac et al. | 382/164 |
| 2010/0195933 A1 | 8/2010 | Nafarieh | |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 | 10/2010 | Khorsheed et al. | |
| 2010/0296729 A1 | 11/2010 | Mossakowski | |
| 2011/0052094 A1 | 3/2011 | Gao et al. | |
| 2011/0081083 A1 | 4/2011 | Lee et al. | |
| 2011/0188756 A1 | 8/2011 | Lee et al. | |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1 | 11/2011 | Showering et al. | |
| 2012/0051642 A1 | 3/2012 | Berrani et al. | |
| 2012/0066213 A1 | 3/2012 | Ohguro | |
| 2012/0092329 A1 | 4/2012 | Koo et al. | |
| 2012/0114245 A1 | 5/2012 | Lakshmanan et al. | |
| 2012/0155754 A1 | 6/2012 | Chen et al. | |
| 2013/0194448 A1 | 8/2013 | Baheti et al. | |
| 2013/0195315 A1 | 8/2013 | Baheti et al. | |
| 2013/0195360 A1 | 8/2013 | Kumar et al. | |
| 2014/0023270 A1 | 1/2014 | Baheti et al. | |
| 2014/0023271 A1 | 1/2014 | Baheti et al. | |
| 2014/0023273 A1 | 1/2014 | Baheti et al. | |
| 2014/0023274 A1 | 1/2014 | Barman et al. | |
| 2014/0023275 A1 | 1/2014 | Kumar et al. | |
| 2014/0023278 A1 | 1/2014 | Kumar et al. | |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Chen, X. et al. "Detecting and Reading Text in Natural Scenes," IEEE Computer Society Conference on Computer Vision and Pattern Recognition (CVPR'04), 2004, pp. 1-8.

Epshtein, B. et al. "Detecting text in natural scenes with stroke width transform," Computer Vision and Pattern Recognition (CVPR) 2010, pp. 1-8, (as downloaded from "http://research.microsoft.com/pubs/149305/1509.pdf").

Jain, A. K. et al. "Automatic text location in images and video frames", Pattern Recognition, vol. 31, No. 12, 1998, pp. 2055-2076.

Jayadevan, R. et al. "Offline Recognition of Devanagari Script: A Survey", IEEE Transactions on Systems, Man, and Cybernetics— Part C: Applications and Reviews, 2010, pp. 1-15.

Kapoor, R. et al. "Skew angle detection of a cursive handwritten Devanagari script character image", Indian Institute of Science, May-Aug. 2002, pp. 161-175.

Lee, S-W. et al. "A new methodology for gray-scale character segmentation and recognition," IEEE Transactions on Pattern Analysis and Machine Intelligence, vol. 18, No. 10, Oct. 1996, pp. 1045-1050.

Li, H. et al. "Automatic Text Detection and Tracking in a Digital Video", IEEE Transactions on Image Processing, vol. 9 No. 1, Jan. 2000, pp. 147-156.

Matas, J. et al. "Robust Wide Baseline Stereo from Maximally Stable Extremal Regions", Proc. of British Machine Vision Conference, 2002, pp. 384-393.

Mikulik, A. et al. "Construction of Precise Local Affine Frames," Center for Machine Perception, Czech Technical University in Prague, Czech Republic, Abstract and second paragraph of Section 1; Algorithms 1 & 2 of Section 2 and Section 4, International Conference on Pattern Recognition, 2010, pp. 1-5.

Pal, U. et al. "Indian script character recognition: a survey", Pattern Recognition Society, published by Elsevier Ltd, 2004, pp. 1887-1899.

Shin, H. et al. "Application of Floyd-Warshall LabellingTechnique: Identification of Connected Pixel Components in Binary Image", Kangweon-Kyungki Math. Jour. 14 (2006), No. 1, pp. 47-55.

Nister, D. et al. "Linear Time Maximally Stable Extremal Regions", ECCV, 2008, Part II, LNCS 5303, pp. 183-196, published by Springer-Verlag Berlin Heidelberg.

Park, J-M. et al. "Fast Connected Component Labeling Algorithm Using a Divide and Conquer Technique", believed to be published in Matrix (2000), vol. 4, Issue: 1, Publisher: Elsevier Ltd, pp. 4-7.

Elgammal, A. M. et al. "Techniques for Language Identification for Hybrid Arabic-English Document Images", believed to be published in 2001 in Proceedings of IEEE 6th International Conference on Document Analysis and Recognition, pp. 1-5.

Pardo, M. et al. "Learning From Data: A Tutorial With Emphasis on Modern Pattern Recognition Methods," IEEE Sensors Journal, vol. 2, No. 3, Jun. 2002, pp. 203-217.

Holmstrom, L. et al. "Neural and Statistical Classifiers—Taxonomy and Two Case Studies," IEEE Transactions on Neural Networks, vol. 8, No. 1, Jan. 1997, pp. 5-17.

Machine Learning, retrieved from http://en.wikipedia.org/wiki/Machine_learning, May 7, 2012, pp. 1-8.

Moving Average, retrieved from http://en.wikipedia.org/wiki/Moving_average, Jan. 23, 2013, pp. 1-5.

(56) References Cited

OTHER PUBLICATIONS

Chen, H. et al. "Robust Text Detection in Natural Images With Edge-Enhanced Maximally Stable Extremal Regions", believed to be published in IEEE International Conference on Image Processing (ICIP), Sep. 2011, pp. 1-4.

Dlagnekov, L. et al. "Detecting and Reading Text in Natural Scenes", Oct. 2004, pp. 1-22.

Vedaldi, A. "An Implementation of Multi-Dimensional Maximally Stable Extremal Regions", Feb. 7, 2007, pp. 1-7.

VLFeat—Tutorials—MSER, retrieved from http://www.vlfeat.org/overview/mser.html, Apr. 30, 2012, pp. 1-2.

Renold, M. "Detecting and Reading Text in Natural Scenes", Master's Thesis, May 2008, pp. 1-59.

Jain, A. K. et al. "Automatic Text Location in Images and Video Frames," believed to be published in Proceedings of Fourteenth International Conference on Pattern Recognition, vol. 2, Aug. 1998, pp. 1497-1499.

Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Co-pending U.S. Appl. No. 13/831,237, filed Mar. 14, 2013, (34 pages).

Co-pending U.S. Appl. No. 13/842,985, filed Mar. 15, 2013 (53 pages).

Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR2011.28 ISBN: 978-1-45-771350-7.

Wu V., et al., "TextFinder: An Automatic System to Detect and Recognize Text in Images", IEEE Transactions on Pattern Analysis and Machine Intelligence, vol. 21. No. 11, Nov. 1, 1999, pp. 1224-1229, XP055068381.

Agrawal, et al., "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

Chaudhuri B.B., et al., "An OCR system to read two Indian language scripts: Bangla and Devnagari (Hindi)", Proceedings of the 4th International Conference on Document Analysis and Recognition (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Chaudhury S (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].

Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.

Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514, ISBN: 978-1-4244-1630-1 abstract Section 2. Multi-resoltuion MSER.

Minoru, M., Ed., "Character Recognition", Aug. 2010, Sciyo, XP002715748, ISBN: 978-953-307-105-3 pp. 91-95, p. 92, section "7.3 Baseline Detection Process".

Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.

Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.

Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006 , pp. 696-705, XP027922538, ISSN: 0167-8655.

Ray A.K et al., "Information Technology—Principles and Applications". 2004. Prentice-Hall of India Private Limited. New Delhi! XP002712579, ISBN: 81-203-2184-7, pp. 529-531.

Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.

Senk V., et al., "A new bidirectional algorithm for decoding trellis codes," EUROCON' 2001, Trends in Communications, International Conference on Jul. 4-7, 2001, Piscataway, NJ, USA, IEEE, Jul. 4, 2001, pp. 34-36, vol. I, XP032155513, DOI :10.1109/EUROCON. 2001.937757 ISBN : 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York NY, USA,IEEE, US, vol. 2, Oct. 22, 1995, pp. 1621-1626, XP010194509, DOI: 10.1109/ICSMC.1995. 538004 ISBN: 978-0-7803-2559-3 the whole document.

Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand col. p. 123.

Written Opinion of the International Preliminary Examining Authority—PCT/US2013/023003—IPEA/EPO—Feb. 13, 2014.

"4.1 Points and patches" In: Szeliski Richard: "Computer Vision—Algorithms and Applications", 2011, Springer-Verlag, London, XP002696110, p. 195, ISBN: 978-1-84882-934-3.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.

Chowdhury A.R., et al., "Text Detection of Two Major Indian Scripts in Natural Scene Images", Sep. 22, 2011, Camera-Based Document Analysis and Recognition, Springer Berlin Heidelberg, pp. 42-57, XP019175802, ISBN: 978-3-642-29363-4.

Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.

International Search Report and Written Opinion—PCT/US2013/023003—ISA/EPO—May 16, 2013, pp. 1-11.

Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

\* cited by examiner

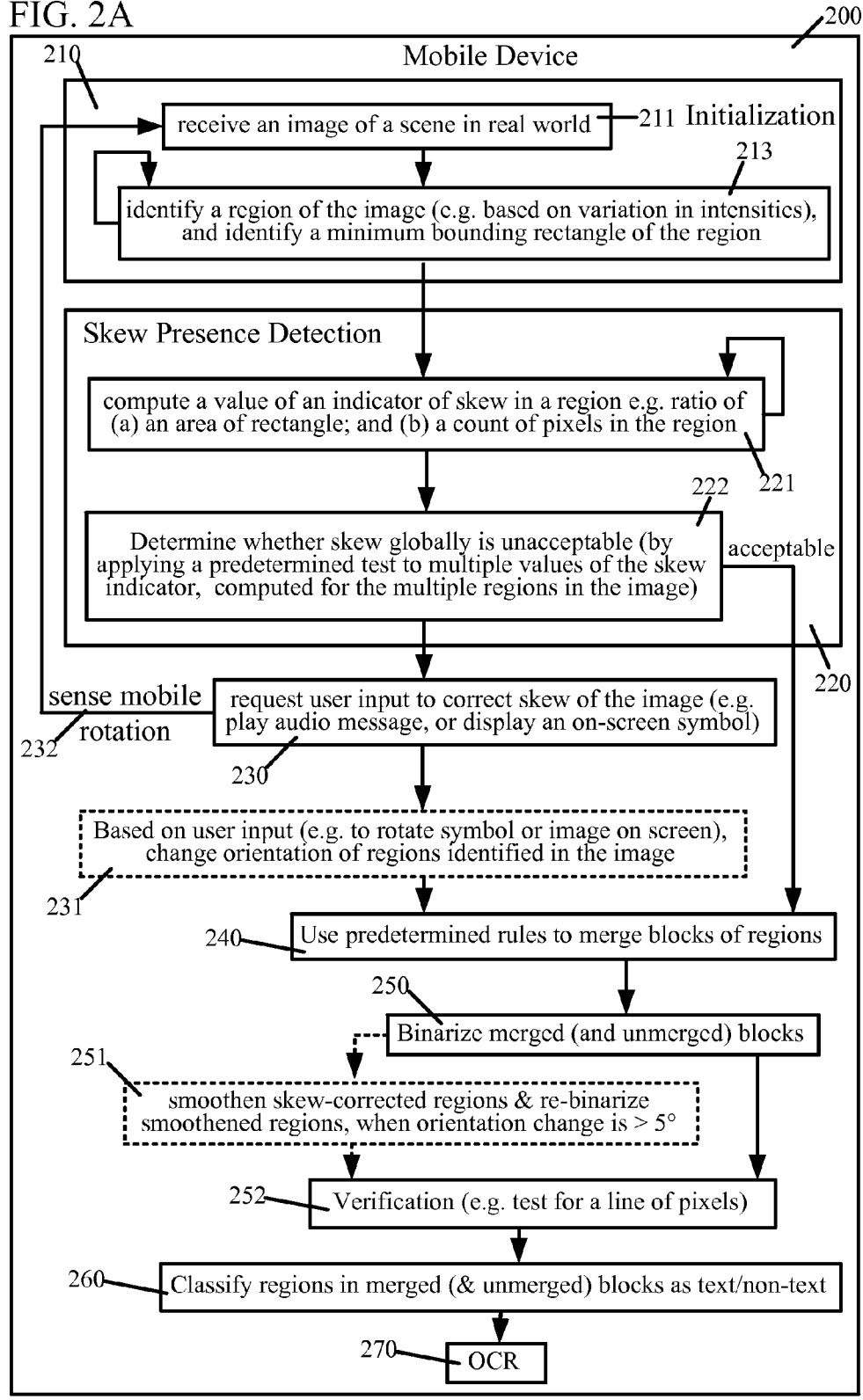

| Skew (angle) | Block | Metric |
|---|---|---|
| 0 |  | 2.78 |
| 15 |  | 5.04 |
| 30 |  | 6.94 |
| 45 |  | 7.68 |

| Skew (angle) | Block | Metric |
|---|---|---|
| 0 |  | 3.08 |
| 15 |  | 4.54 |
| 30 |  | 5.07 |
| 45 |  | 6.01 |

| Skew (angle) | Block | Metric |
|---|---|---|
| 0 |  | 2.58 |
| 15 |  | 2.98 |
| 30 |  | 3.8 |
| 45 |  | 4.25 |

| Skew (angle) | Block | Metric |
|---|---|---|
| 0 |  | 3.03 |
| 15 |  | 3.76 |
| 30 |  | 4.27 |
| 45 |  | 4.82 |

DETECTING AND CORRECTING SKEW IN REGIONS OF TEXT IN NATURAL IMAGES

CROSS-REFERENCE TO PROVISIONAL APPLICATIONS

This application claims priority under 35 USC §119 (e) from U.S. Provisional Application No. 61/590,966 filed on Jan. 26, 2012 and entitled "Identifying Regions Of Text To Merge In A Natural Image or Video Frame", which is assigned to the assignee hereof and which is incorporated herein by reference in its entirety.

This application claims priority under 35 USC §119 (e) from U.S. Provisional Application No. 61/590,983 filed on Jan. 26, 2012 and entitled "Detecting and Correcting Skew In Regions Of Text In Natural Images", which is assigned to the assignee hereof and which is incorporated herein by reference in its entirety.

This application claims priority under 35 USC §119 (e) from U.S. Provisional Application No. 61/590,973 filed on Jan. 26, 2012 and entitled "Rules For Merging Blocks Of Connected Components In Natural Images", which is assigned to the assignee hereof and which is incorporated herein by reference in its entirety.

This application claims priority under 35 USC §119 (e) from U.S. Provisional Application No. 61/673,703 filed on Jul. 19, 2012 and entitled "Automatic Correction of Skew In Natural Images and Video", which is assigned to the assignee hereof and which is incorporated herein by reference in its entirety.

CROSS-REFERENCE TO RELATED APPLICATIONS

This application is also related to U.S. application Ser. No. 13/748,539, filed concurrently herewith, entitled "Identifying Regions Of Text To Merge In A Natural Image or Video Frame" which is assigned to the assignee hereof and which is incorporated herein by reference in its entirety.

This application is also related to U.S. application Ser. No. 13/748,574, filed concurrently herewith, entitled "Rules For Merging Blocks Of Connected Components In Natural Images" which is assigned to the assignee hereof and which is incorporated herein by reference in its entirety.

FIELD

This patent application relates to devices and methods for detecting and manual correction of skew, in regions of natural images or video frames that are not yet classified as text or non-text.

BACKGROUND

Identification of text regions in papers that are scanned (e.g. by a flatbed scanner of a copier) is significantly easier (e.g. due to upright orientation, large size and slow speed) than detecting text regions in images of scenes in the real world (also called "natural images") captured in real time by a handheld device (such as a smartphone) having a built-in digital camera. FIG. 1A illustrates a newspaper 100 in the real world in India. A user 110 (see FIG. 1B) may use a camera-equipped mobile device (such as a cellular phone) 108 to capture an image 107 of newspaper 100. Captured image 107 may be displayed on a screen 106 of mobile device 108. Such an image 107 (FIG. 1C) if processed directly by application of prior art techniques used in document processing may result in a failure to classify one or more regions 103, 105 as text (see FIG. 1A), e.g. due to variations in lighting, color, tilt, focus, etc. Specifically, document processing techniques that are successfully used on scanned documents (during Optical Character Recognition, also called OCR) generate too many false positives and/or negatives, so as to be impractical for use on real world images.

Hence, detection of text regions in a real world image is performed using different techniques. For additional information on techniques used in the prior art, to identify text regions in natural images, see the following articles that are incorporated by reference herein in their entirety as background:

(a) H. Li et al. "Automatic text detection and tracking in digital video," IEEE transactions on Image processing, vol. 9, no. 1, pp. 147-156, 2000;

(b) X. Chen and A. Yuille, "Detecting and reading text in natural scenes," IEEE Computer Society Conference on Computer Vision and Pattern Recognition (CVPR'04), 2004, pages 1-8;

(c) S. W. Lee et al, "A new methodology for gray-scale character segmentation and recognition," IEEE Transactions on Pattern Analysis and Machine Intelligence, October 1996, pp. 1045-1050, vol. 18, no. 10;

(d) B. Epshtein et al, "Detecting text in natural scenes with stroke width transform," Computer Vision and Pattern Recognition (CVPR) 2010, pages 2963-2970; and (e) A. Jain and B. Yu, "Automatic text location in images and video frames", Pattern Recognition, 1998, pp. 2055-2076, Vol. 31, No. 12.

When a natural image 107 (FIG. 1B) is processed to form blocks 103A, 103B, 103C and 103D of text regions (FIG. 1C), some prior art methods of the type described above operate under the assumption that there is no skew (also called orientation, slant or tilt) in text relative to a camera that is used to generate the image, e.g. that text lines are oriented horizontally (or vertically depending on the language) relative to boundaries of the image. Some prior art methods fail when skew becomes significant (e.g. greater than 5 degrees), e.g. due to errors in classifying blocks as being text or non-text (prior to OCR which is performed in a limited manner, only on blocks classified as text). A specific amount of skew, at which prior art methods begin to fail noticeably, depends on the prior art method and the number of errors that are acceptable. Hence, some classifiers may correctly classify a block as text or non-text when skew is small (e.g. within ±5 degrees) relative to the camera, as illustrated in FIG. 1C. But, when skew becomes large (e.g. 30 degrees) as illustrated in FIG. 1D, several prior art classifiers fail to classify the block correctly. So, there is a need to detect and correct skew in a natural image or video frame, prior to classification of regions therein, as described below.

SUMMARY

In several aspects of described embodiments, an electronic device and method use a camera to capture an image of an environment outside the electronic device, followed by identification of regions of pixels in the image based on pixel intensities. Each region is identified to include pixels that are contiguous with one another (e.g. a connected component), and in some embodiments each region is identified to include therein a local extrema of intensity in the image.

After one or more regions in the image are identified, corresponding one or more values of an indicator of skew are automatically computed. One or more regions for which a skew indicator is computed may be automatically selected, e.g. based on a geometric property (such as an aspect ratio of a region, or stroke width), and/or based on presence of a line of pixels of a common binary value in the region. For example, some embodiments compute, for use as an indicator of skew of a region i, a ratio $M_i$ of an area $H_i*W_i$ of a minimum bounding box of height $H_i$ and width $W_i$ around region i, and a count $N_i$ of pixels identified to be included in the region $Q_i$ (e.g. in a list of positions).

Then a predetermined test is applied, to multiple values of the skew indicator (corresponding to multiple regions identified in the image), to determine whether skew is unacceptable globally, in the image as a whole. For example, in some embodiments, a counter is incremented each time a value of skew of a region exceeds a threshold (also called "first threshold"), and the predetermined test is found to be met when the counter exceeds another threshold (also called "second threshold").

When skew is determined to be unacceptable, user input is automatically requested, to correct skew of the image. For example, some embodiments display a symbol on a screen, to prompt user input. User input may be received as rotation of an area of touch on the screen, through an angle between a direction of the symbol and a direction of the image. User input may alternatively or additionally be received via rotation of a camera, in order to align the direction of the symbol with the direction of the image. Then the above-described process may be repeated in some embodiments, e.g. after receipt of user input of the type just described, or alternatively after passage of a predetermined duration of time (also called "timeout"), to check whether the predetermined test is satisfied. Certain embodiments may capture a skew-corrected image (based on the user input), detect skew again this time in the skew-corrected image, and if necessary request user input once again. At any stage, when skew is found to be less than a preset limit (e.g. 5 degrees) in some embodiments, the image may be further processed, in the normal manner (e.g. subject to OCR). In several embodiments, the above-described process is performed prior to classification (e.g. by a neural network) of the image's regions (whose skew is being determined and corrected), as text or non-text.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2A illustrates, in a high-level flow chart, various acts performed by a mobile device 200 in some aspects of the described embodiments.

DETAILED DESCRIPTION

Figure 1A:
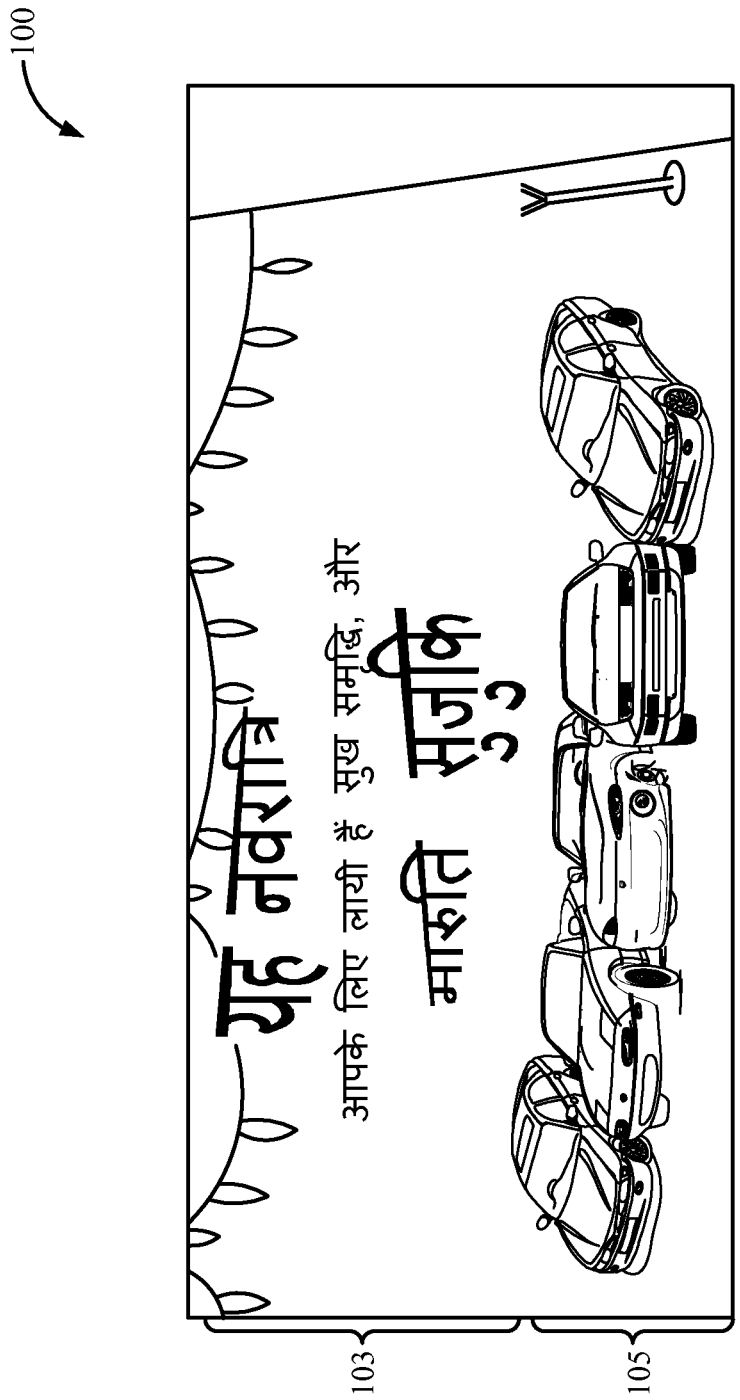
FIG. 1A illustrates a newspaper of the prior art, in the real world in India.
Figure 1B:
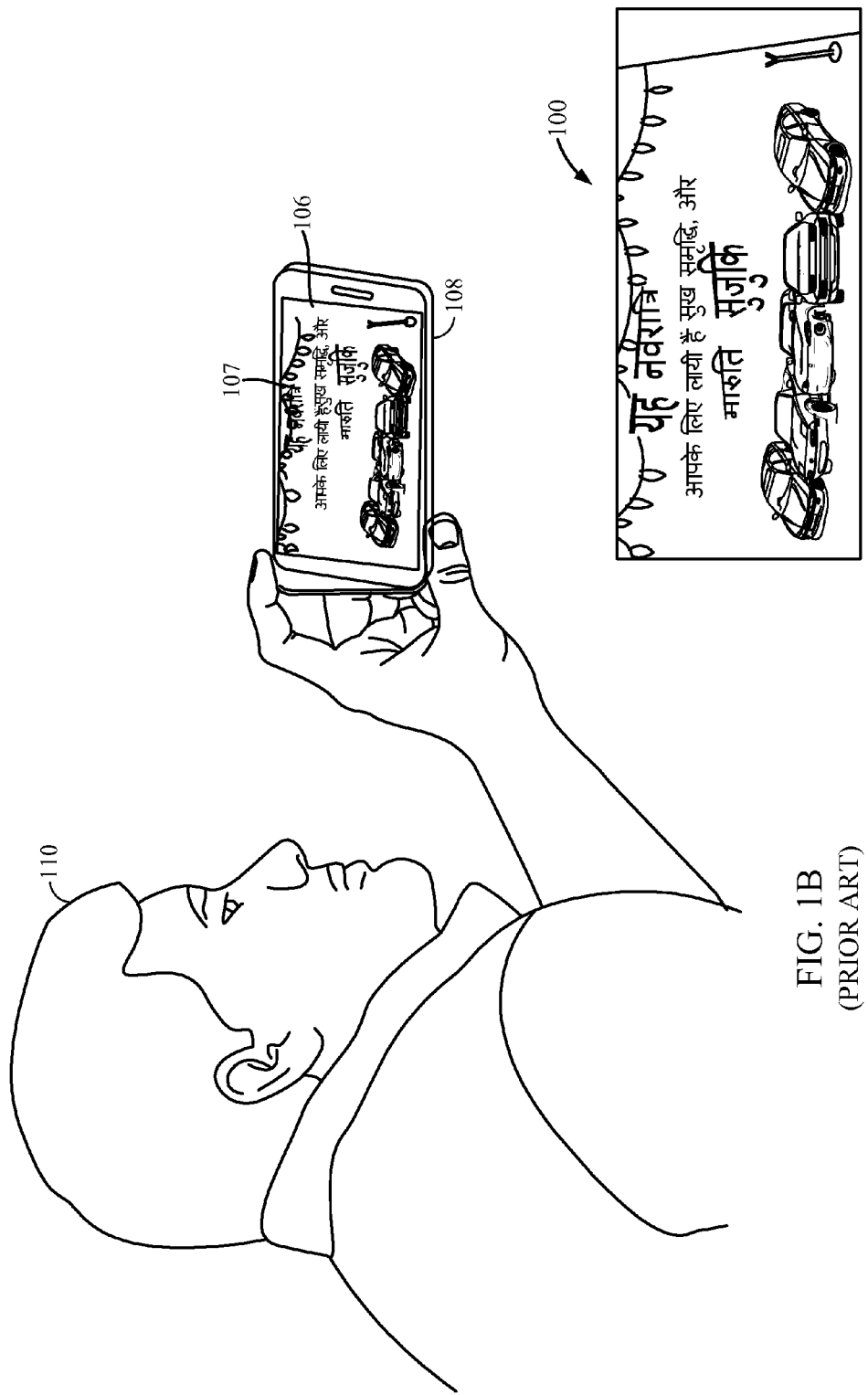
FIG. 1B illustrates a user using a camera-equipped mobile device of the prior art to capture an image of a newspaper in the real world.
Figure 1C:
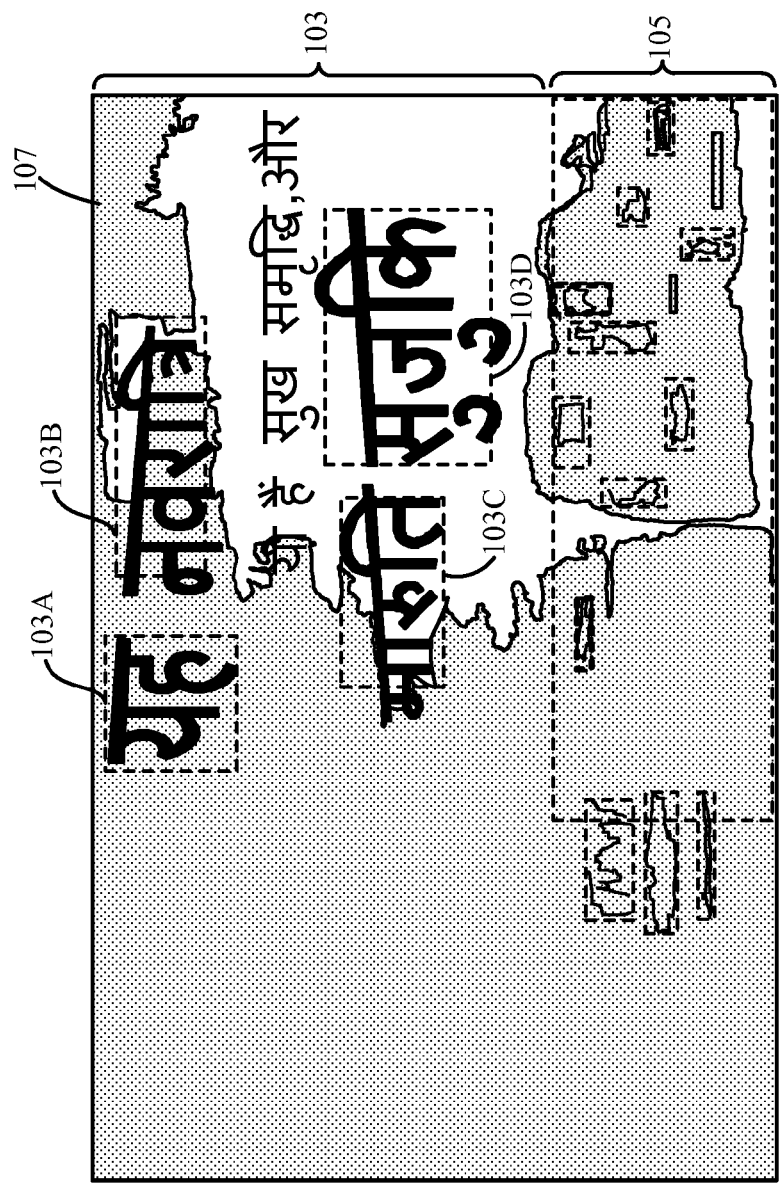
FIG. 1C illustrates blocks formed by identifying connected components in a portion of the image of FIG. 1B by use of a prior art method.
Figure 1D:
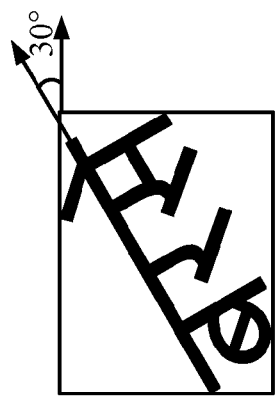
FIG. 1D illustrates a prior art image containing a word of text skewed by 30° relative to the camera.
Figure 6:
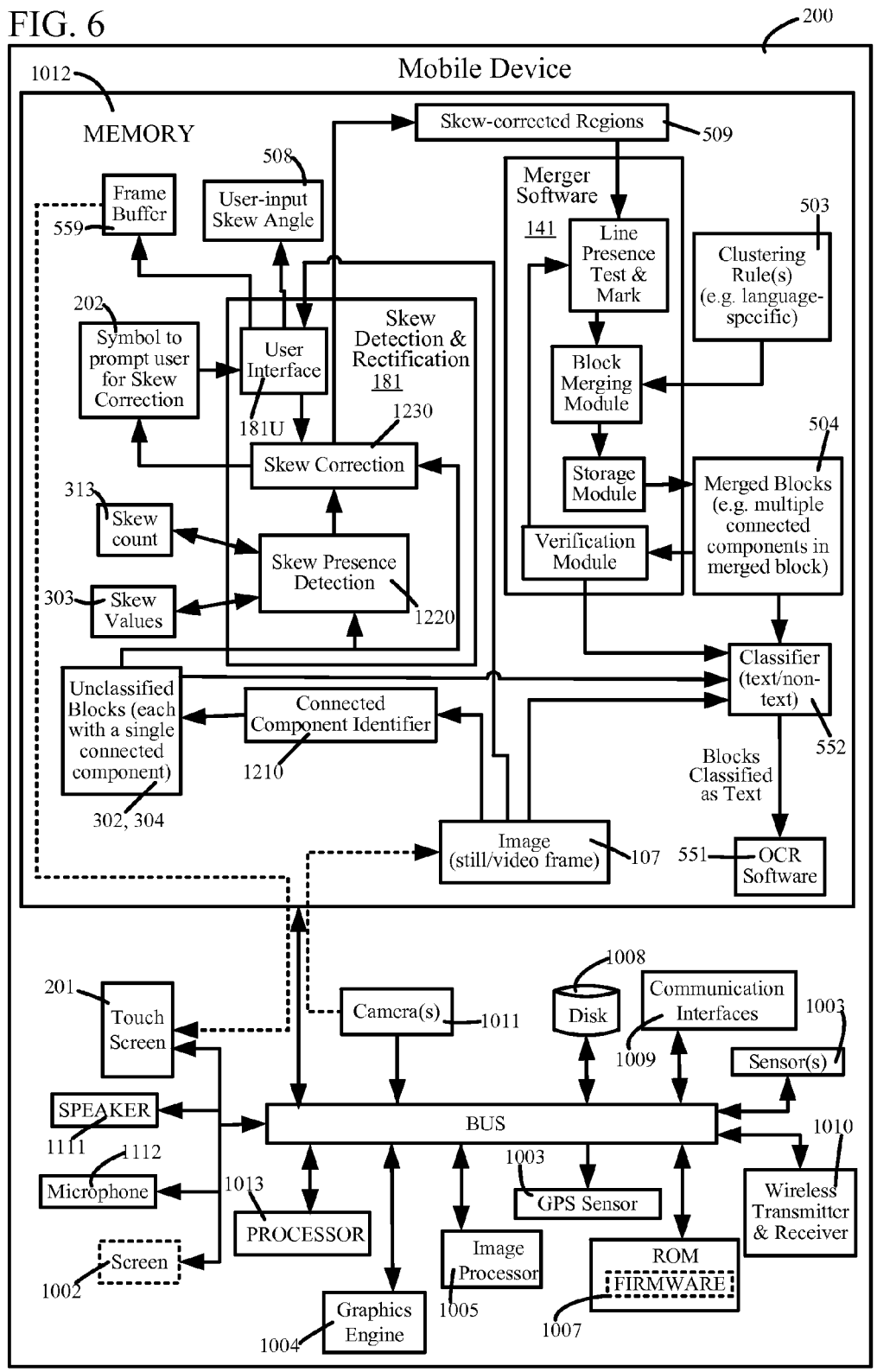
FIG. 6 illustrates, in a block diagram, a mobile device including processor and memory of the type described above, in some aspects of the described embodiments.

Regions in an image of a scene in real world are initially identified in described embodiments, in the normal manner. For example, as described above in reference to FIGS. 1A-1C, a mobile device (e.g. a smartphone or a tablet) 200 may use a camera 204 therein (FIG. 2B), to capture an image of an environment outside the device, such as a scene of real world, as per act 211 in FIG. 2A. Thereafter, a processor 1013 (FIG. 6) in mobile device 200 identifies, by repeatedly performing the act 213 in FIG. 2A, several regions in an image 203 (also called "natural image") which may be captured, e.g. as a frame of live video by a video camera or as a still image by a digital camera. The regions are identified in the normal manner during initialization operation 210, e.g. based on variation in intensities of pixels in image 203.

A specific manner in which pixels of a region differ from surrounding pixels at the boundary may be identified by use of an MSER method in a predetermined manner in some embodiments by use of a lookup table in memory to obtain input parameters. Such a lookup table may supply one or more specific combinations of values for the parameters Δ and Max Variation, which are input to an MSER method (also called MSER input parameters). Such a lookup table may be populated ahead of time, with specific values for Δ and Max Variation, e.g. determined by experimentation to generate contours that are appropriate for recognition of text in a natural image, such as value 8 for Δ and value 0.07 for Max Variation.

In some embodiments, pixels are identified in a set (which may be implemented in a list) that in turn identifies a region $Q_i$ which includes a local extrema of intensity (such as local maxima or local minima) in the image 107. Such a region $Q_i$ may be identified in act 212 (FIG. 2) as being maximally stable relative to one or more intensities in a range i−Δ to i+Δ (depending on the embodiment, including the above-described intensity i), each intensity i being used as a threshold (with Δ being a parameter input to an MSER method) in comparisons with intensities of a plurality of pixels included in region $Q_i$ to identify respective regions $Q_{i-\Delta}$ and $Q_{i+\Delta}$. In some embodiments, a number of pixels in the region $Q_i$ remains within a predetermined (e.g. user specified) range relative to changes in intensity i across a range i−Δ to i+Δ, with a local minima in a ratio $[Q_{i-\Delta} - Q_{i+\Delta}]/Q_i$ occurring at the intensity i. Therefore, the just-described set of positions in certain embodiments are indicative of (or identify) a region $Q_i$ that constitutes an MSER (i.e. a maximally stable extremal region).

Regions may be identified in act 213 by use of a method described in an article entitled "Robust Wide Baseline Stereo from Maximally Stable Extremal Regions" by J. Matas, O. Chum, M. Urban, and T. Pajdla, BMVC 2002, 10 pages that is incorporated by reference herein in its entirety. Alternatively other methods can be used to perform connected component analysis and identification of regions in act 212 e.g. as described in an article entitled "Application of Floyd-Warshall Labelling Technique: Identification of Connected Pixel Components In Binary Image" by Hyunkyung Shin and Joong Sang Shin, published in Kangweon-Kyungki Math. Jour. 14 (2006), No. 1, pp. 47-55 that is incorporated by reference herein in its entirety, or as described in an article entitled "Fast Connected Component Labeling Algorithm Using A Divide and Conquer Technique" by Jung-Me Park, Carl G. Looney and Hui-Chuan Chen, published Matrix (2000), Volume: 4, Issue: 1, Publisher: Elsevier Ltd, pages 4-7 that is also incorporated by reference herein in its entirety.

A specific manner in which regions of an image 107 are identified in act 213 by mobile device 200 in described embodiments can be different, depending on the embodiment. In several embodiments, each region of image 107 that is identified by use of an MSER method of the type described above is represented by act 213 in the form of a list of pixels, with two coordinates for each pixel, namely the x-coordinate and the y-coordinate in two dimensional space (of the image).

After identification of regions, each region is initially included in a single rectangular block which may be automatically identified by mobile device 200 of some embodiments in act 212, e.g. as a minimum bounding rectangle of a region, by identification of a largest x-coordinate, a largest y-coordinate, a smallest x-coordinate and a smallest y-coordinate of all pixels within the region. The just-described four coordinates may be used in act 212, or subsequently when needed, to identify the corners of a rectangular block that tightly fits the region. As discussed below, such a block (and therefore its four corners) may be used in checking whether a clustering rule 503 (FIG. 6) is satisfied, e.g. by one or more geometric attributes of the block and/or attributes relative to an adjacent block. Also, a block may need to be identified, in order to binarize all pixels in the block, followed by generation of a profile of counts of pixels of a common binary value. When needed, four corners of a rectangular block that includes a region may be identified, e.g. as follows:

(largest x-coordinate, largest y-coordinate),
(largest x-coordinate, smallest y-coordinate),
(smallest x-coordinate, largest y-coordinate) and
(smallest x-coordinate, smallest y-coordinate).

The above-described acts 211 and 213 are performed in several embodiments, in an initialization operation 210 (FIG. 2) in a manner similar or identical to corresponding operations of the prior art, for example as described above in reference to FIGS. 1A-1C. Accordingly, each block (also called "unmerged block" or "initially identified block") that is identified at the end of act 212 of some embodiments contains a single region (which may constitute a "connected component"), such as an MSER.

After the regions are identified, a mobile device 200 of many described embodiments performs skew presence detection in an operation 220 (see FIG. 2A), followed by skew correction in operation 230. Note that operations 220 and 230 are performed prior to classification of pixels into text or non-text in operation 260 (described below). Moreover, operations 220 and 230 of some embodiments are performed prior to merging blocks of regions that are adjacent to one another (e.g. in operation 240), and also prior to binarization (e.g. in operation 250).

During operation 220, processor 1013 of some embodiments performs acts 221 and 222 as follows. In act 221, mobile device 200 calculates a value of an indicator of skew locally, in a specific region identified in act 213. The indicator of skew that is computed in act 221 can be different, depending on the embodiment. Some embodiments of processor 1013 compute a value of the indicator of skew in act 221 for each region $Q_i$, by using (a) an area of the rectangle that tightly fits the region $Q_i$ (also called "minimum bounding rectangle") and (b) a count of pixels in the region $Q_i$, to obtain a metric $M_i$, which may be used to determine skew of the region i. In several such embodiments, the metric $M_i$ is compared with a threshold t1 to determine whether or not skew in the region $Q_i$ is acceptable or not (e.g. not acceptable when skew angle of a region is greater than ±5 degrees), thereby to obtain a binary-valued indicator of skew in each region $Q_i$. In other such embodiments, the metric $M_i$ is directly used, as a real-valued indicator of skew in each region i.

A value of an indicator of skew that is computed in act 221 for each region is stored either individually (for each region) or in aggregate (across multiple regions), at a specific location in memory. Some embodiments increment in the memory a skew count for the entire image each time a region is marked as skew-present. Other embodiments label each region individually in memory as either skew-present or skew-absent. Note that it is not known at this stage in such embodiments whether or not a feature formed by the region is text or non-text, although a value of an indicator of skew is being determined for the region. In several aspects of the described embodiments, after act 221 (FIG. 2A), processor 1013 performs act 222, by applying a predetermined test to multiple values of the indicator of skew (and/or the metric of skew) that are computed for multiple regions respectively in the image, and the multiple values are used to determine whether skew is present globally, in the image as a whole.

The predetermined test, in which multiple values of the indicator of skew of different regions are used in aggregate in act 222 by processor 1013 can be different, in different embodiments. For example, certain embodiments of the predetermined test of act 222 may use statistical methods to compute mean or median of the multiple values, followed by filtering outliers among the multiple values, followed by re-computation of mean or median of the filtered values and comparison to a threshold (e.g. greater than ±5 degrees) to determine whether or not skew in the image as a whole is acceptable.

Figure 5:
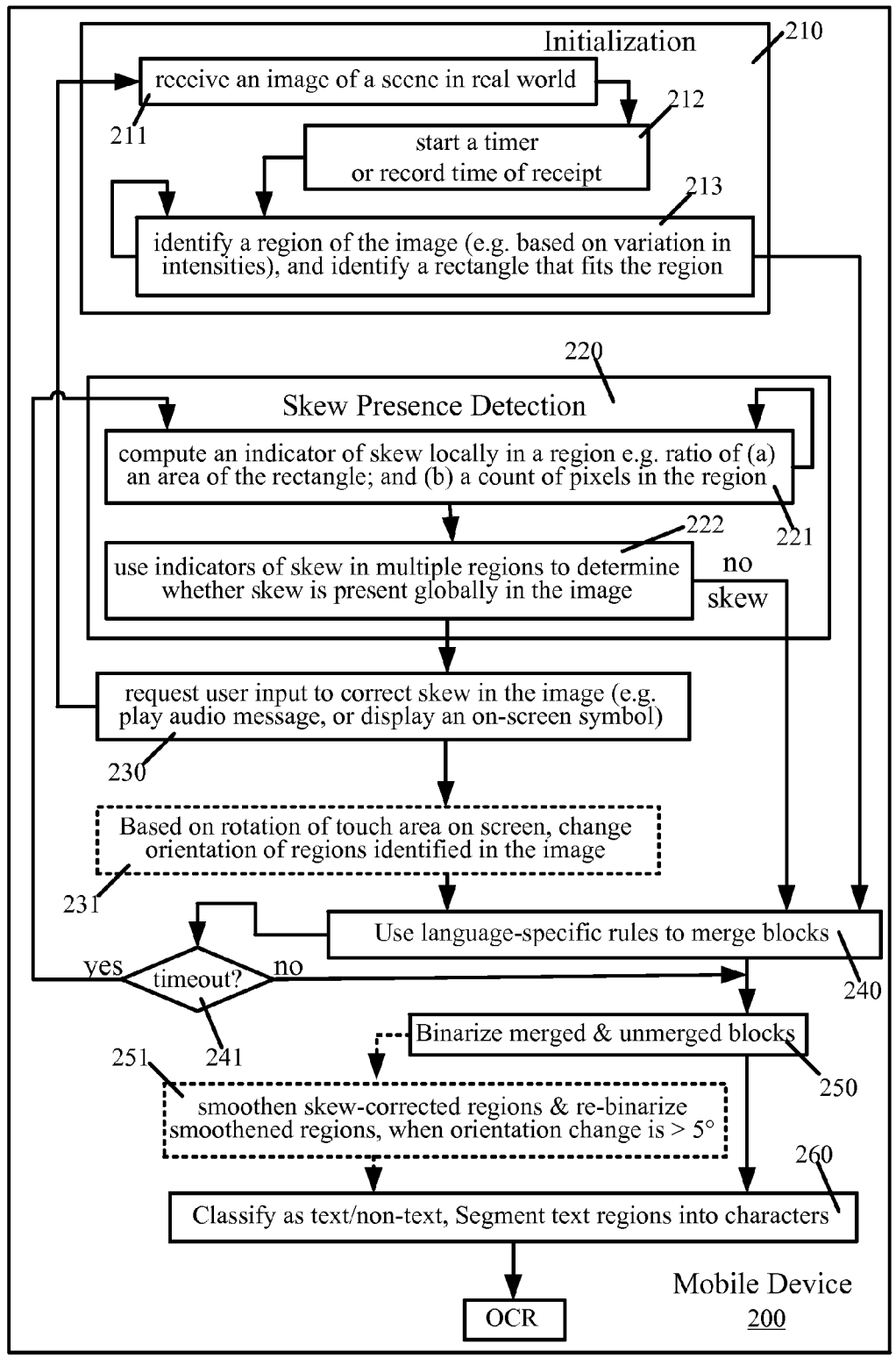
FIG. 5 illustrates, in a high-level flow chart, the acts of FIG. 2A performed with additional acts 212, 241 and 261 in some aspects of the described embodiments.
Figure 7:
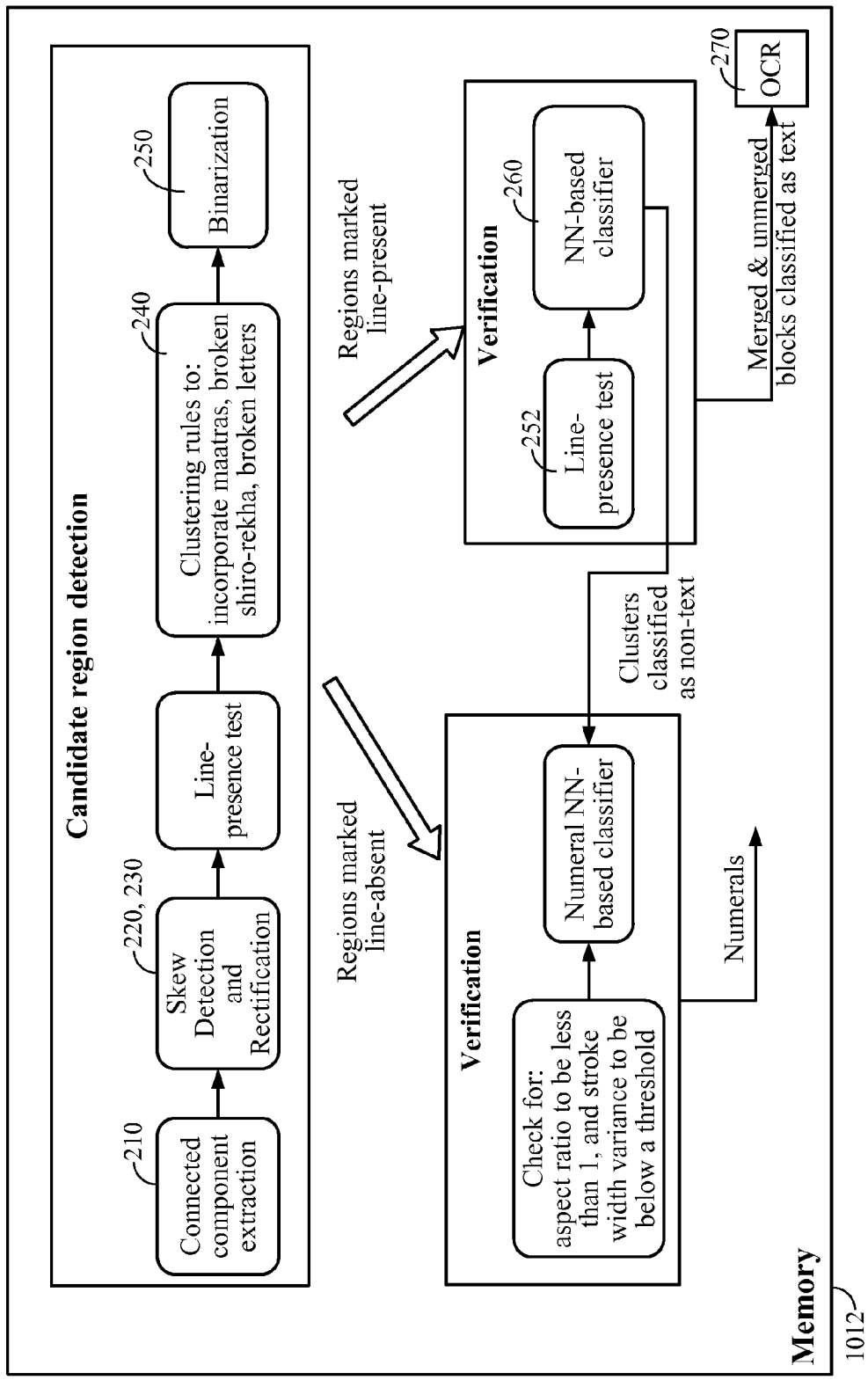
FIG. 7 illustrates, in a block diagram, computer instructions in memory 1012 of the described embodiments, to perform several of the operations illustrated in FIG. 2A.

After operation 220, when skew is found to be acceptable across multiple regions of an image, processor 1013 performs an operation 240 (FIG. 7) which uses predetermined rules to merge blocks that are adjacent to one another, when one of the blocks satisfies a test for presence of a line of pixels of a common binary value. Operation 240 can be implemented in block merger software differently in different embodiments, although some embodiments perform one or more acts of the type described in U.S. application Ser. No. 13/748,574, entitled "Rules For Merging Blocks Of Connected Components In Natural Images" which has been incorporated herein by reference above. Operation 240 is followed by operation 250 in a binarization module that binarizes merged (and unmerged) blocks, to generate binarized blocks (unless there is a timeout which is checked in act 241 as per FIG. 5, and when timeout occurs control returns to act 221).

Operation 250 is followed by an operation 252 (FIG. 7) to verify that a line of pixels of a common binary value is present in the binarized block (whether or not merged), followed by operation 260 (FIG. 7) to classify binarized blocks as text or non-text. Operation 252 can be implemented in a verification module differently in different embodiments, although some embodiments perform one or more acts of the type described in U.S. application Ser. No. 13/748,539, entitled "Identifying Regions of Text to Merge In A Natural Image or Video Frame" which has been incorporated herein by reference, above. After classification in operation 260, one or more blocks that are classified as text are subject to optical character recognition in operation 270 that is implemented in an OCR module, to identify one (or more) character(s) of a predetermined language, such as Hindi.

Figure 3A:
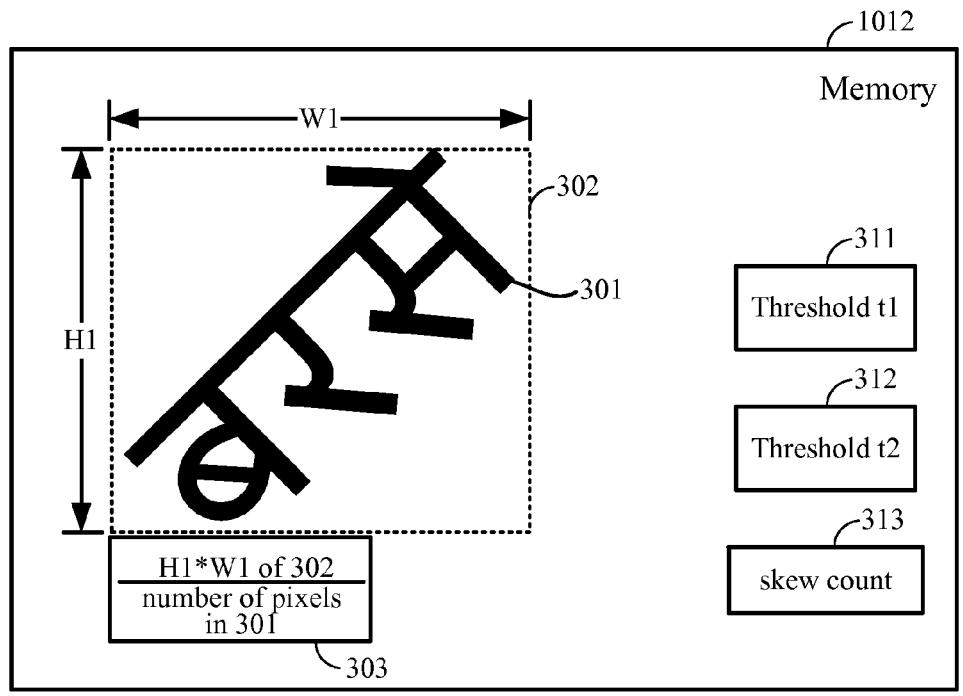
FIGS. 3A and 3B illustrate a memory of a mobile device during performance of the method of FIG. 2A in illustrative aspects of the described embodiments.
Figure 3B:
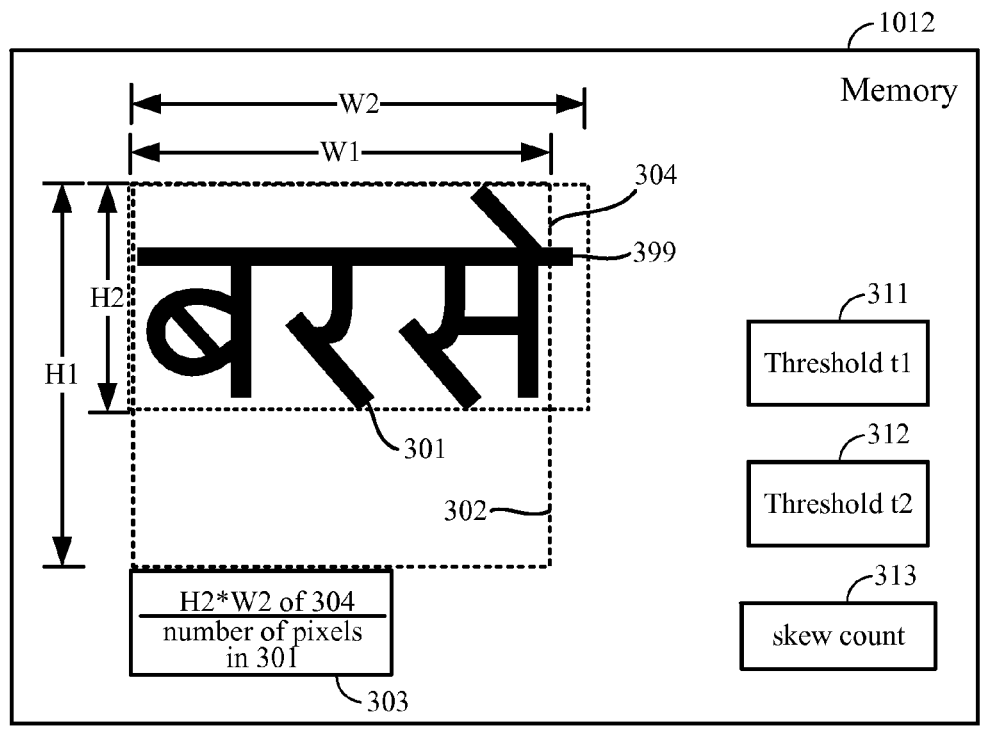

Operations 240, 250, 252, 260 and 270 described above (in the preceding two paragraphs above) are performed by processor 1013 when skew is acceptable, as illustrated by block 304 (FIG. 3B). However, when processor 1013 finds skew to be not acceptable in operation 220 (act 222), then an operation 230 is performed by processor 1013 of many embodiments, to request user input to correct skew in the image. A specific manner in which user input is requested in operation 230 by mobile device 200 can be different, in different embodiments. For example, certain embodiments of operation 230 may play an audio message (e.g. "please correct skew") via speaker 1111 (FIG. 6), or display a symbol (e.g. the plus sign "+") on screen 201 (FIG. 6), or do both (i.e. play audio message and also display an on-screen symbol).

After operation 230, skew is corrected by user action although a specific action to be performed by a user to correct skew of an image can be different, depending on the embodiment, etc. For example, a user may rotate mobile device 200 in a counter clockwise direction, as shown by arrow 205 in FIG. 2B, so that skew is reduced (e.g. to within ±5 degrees) as shown on screen 201 in FIG. 2C. The just-described rotation of mobile device 200 may be sensed by a motion sensor (such as an accelerometer) included in mobile device 200, and in response to this rotation, processor 1013 returns to performing the act 211 (described above) via branch 232 (FIG. 2A).

As another example (not shown), the user may rotate an object 100 that carries text in the scene being imaged (such as a newspaper) so that skew of the image is reduced, relative to a field of view of a camera 204 in mobile device 200. Accordingly, after operation 230, processor 1013 waits for a preset time period and then returns to act 211 to repeat the above-described process. When metrics $M_i \ldots M_j$ of skew in corresponding regions i . . . j become sufficiently small, act 222 indicates skew present globally in the image is acceptable, and then processor 1013 performs operations 240, 250, 252, 260 and 270 described above.

Figure 2B:
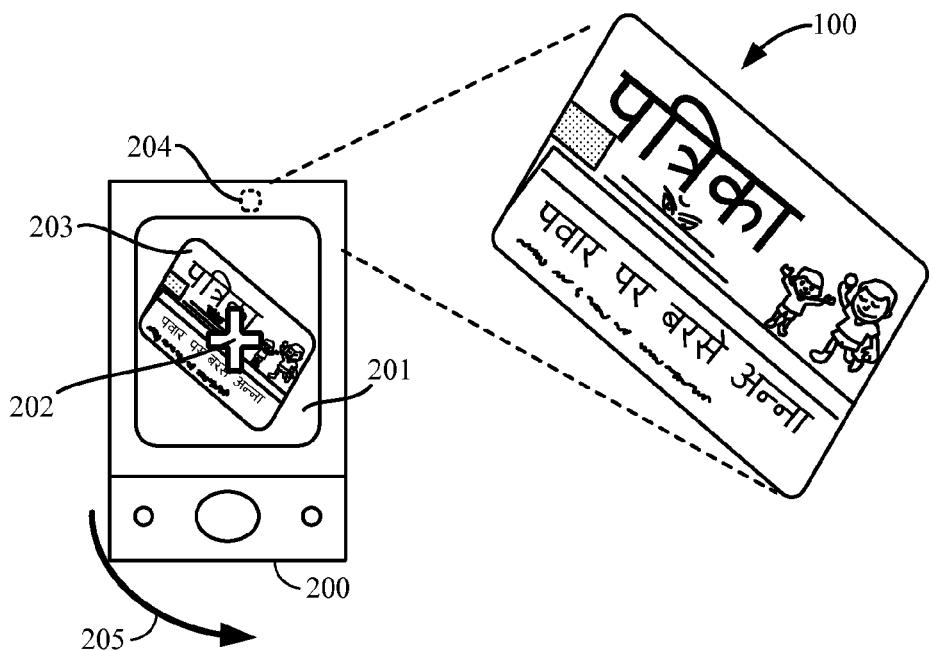
FIG. 2B illustrates a screen 201 of mobile device 200 of some embodiments displaying a symbol 202 overlaid on live video 203 of newspaper 100 captured by a built-in camera 204 in accordance with the acts illustrated in FIG. 2A.
Figure 2C:
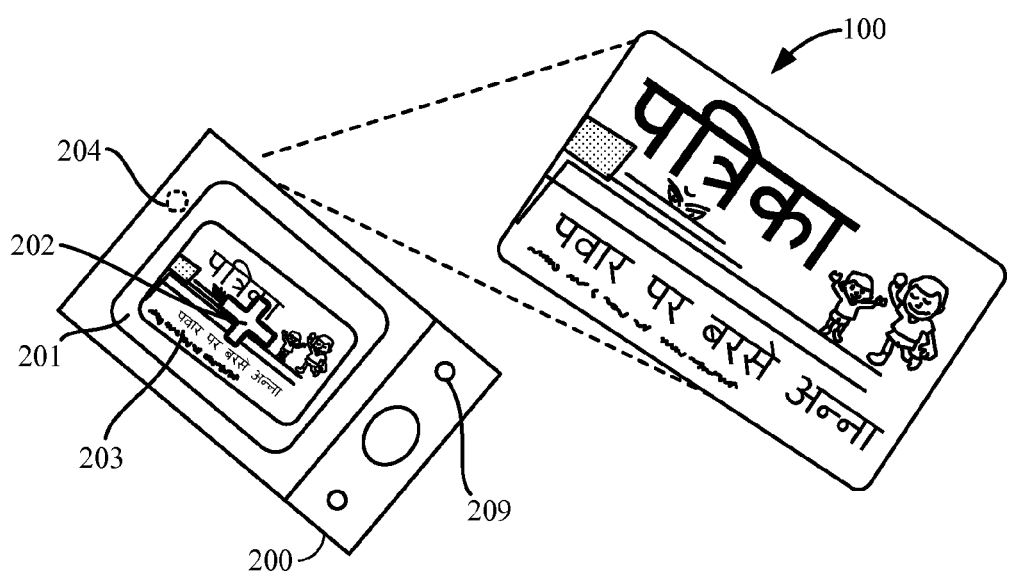
FIG. 2C illustrates mobile device 200 rotated relative to newspaper 100 in an anti-clockwise direction shown by arrow 205 in FIG. 2B, to correct skew between live video (or camera preview) 203 and symbol 202.
Figure 2D:
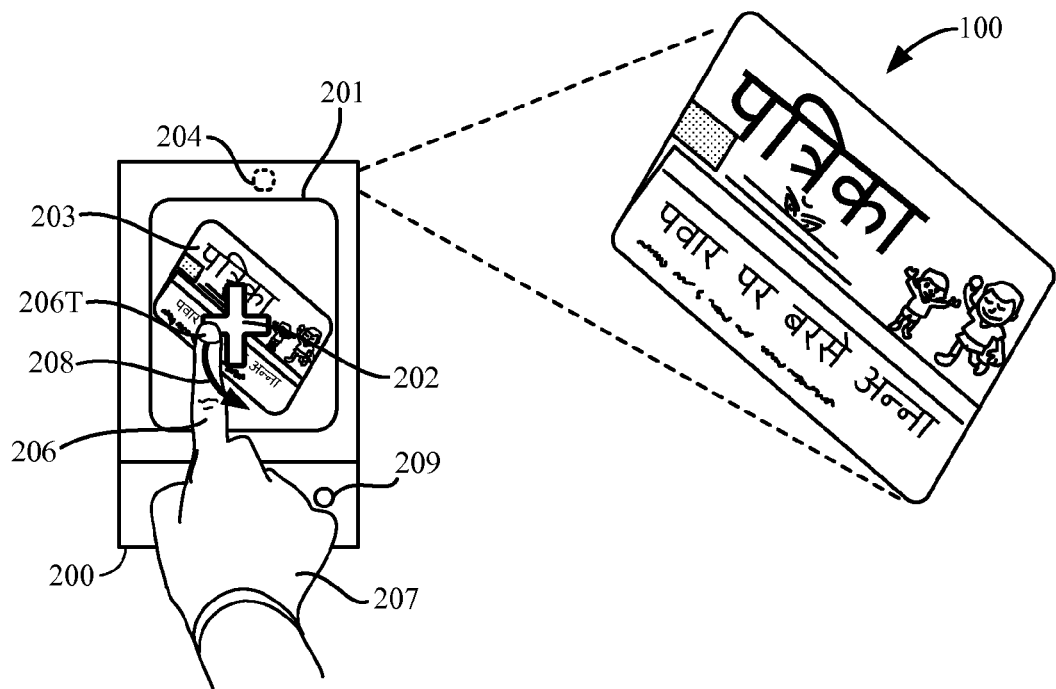
FIG. 2D illustrates certain embodiments wherein symbol 202 is rotatable on screen 201, by sliding a tip 206T of a finger 206 of a user, in a rotation movement shown by arrow 208.
Figure 2E:
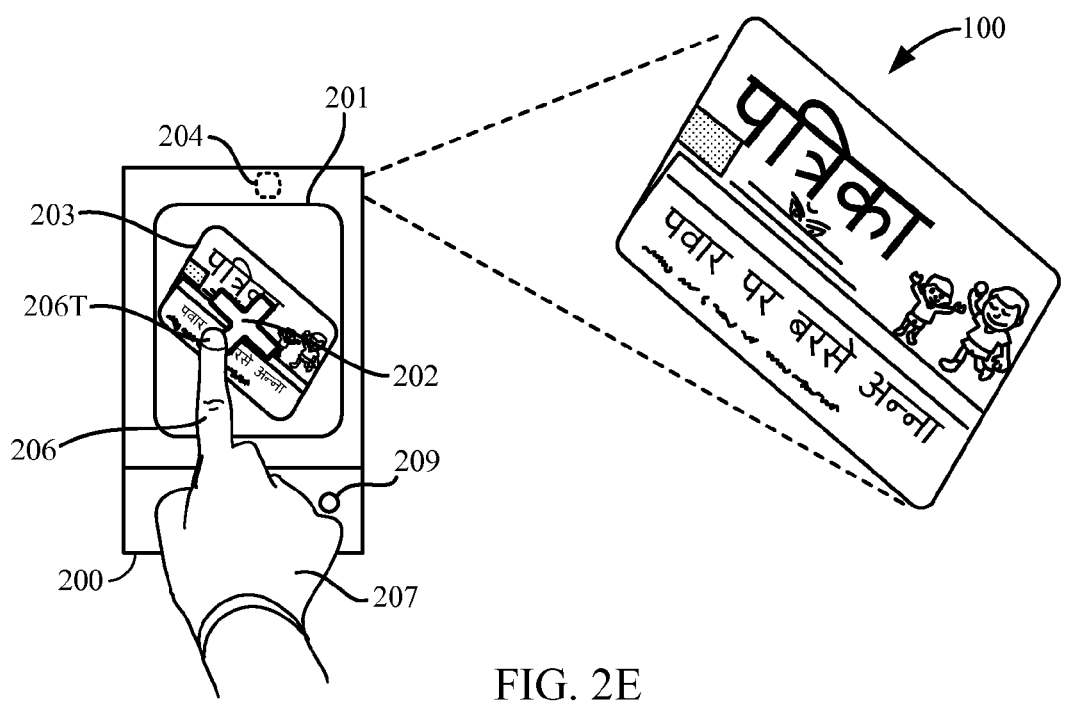
FIG. 2E illustrates symbol 202 rotated relative to image 203 on screen 201 in an anti-clockwise direction shown by arrow 208 in FIG. 2D, to correct skew between symbol 202 and camera preview or live video (or natural image in a snapshot) 203.

As will be readily apparent in view of this detailed description skew can be reduced by user action in other ways, as illustrated in FIGS. 2D-2H, described next. Specifically, as illustrated in FIG. 2D, some embodiments of processor 1013 perform operation 230 to display a symbol 202 superimposed on image 203 included as a portion of a live video (or camera preview, depending on the embodiment), and symbol 202 is made user rotatable by processor 1013. For example, symbol 202 may be rotated by touching and sliding on screen 201, a tip 206T of a finger 206 of a hand 207 of a user (thereby to move an area of touch on screen 201) in a rotation movement shown by arrow 208. When symbol 202 has been sufficiently rotated (as illustrated in FIG. 2E) the user lifts the tip 206T from screen 201, which triggers performance of act 231 (described next).

In act 231, processor 1013 of some embodiments changes orientation of one or more regions in image 203 based on user input (as a measurement of rotation of an area of touch, as shown by arrow 208 in FIG. 2D), followed by operations 240 and 250 (described above). In some embodiments wherein act 231 is performed, an act 251 is performed additionally, to smoothen (e.g. low pass filter) skew-corrected regions, and re-binarize the smoothened regions, when the orientation change in act 231 is sufficiently large (as per a predetermined test). A low pass filter in some embodiments is a simple moving average filter with a moving average window of size 3×3 (i.e., 3 pixels wide in both horizontal and vertical directions). For more details on moving average filters, see http://en.wikipedia.org/wiki/Moving_average. Act 251 (and operation 250) is followed by operations 252, 260 and 270 (described above).

Figure 2F:
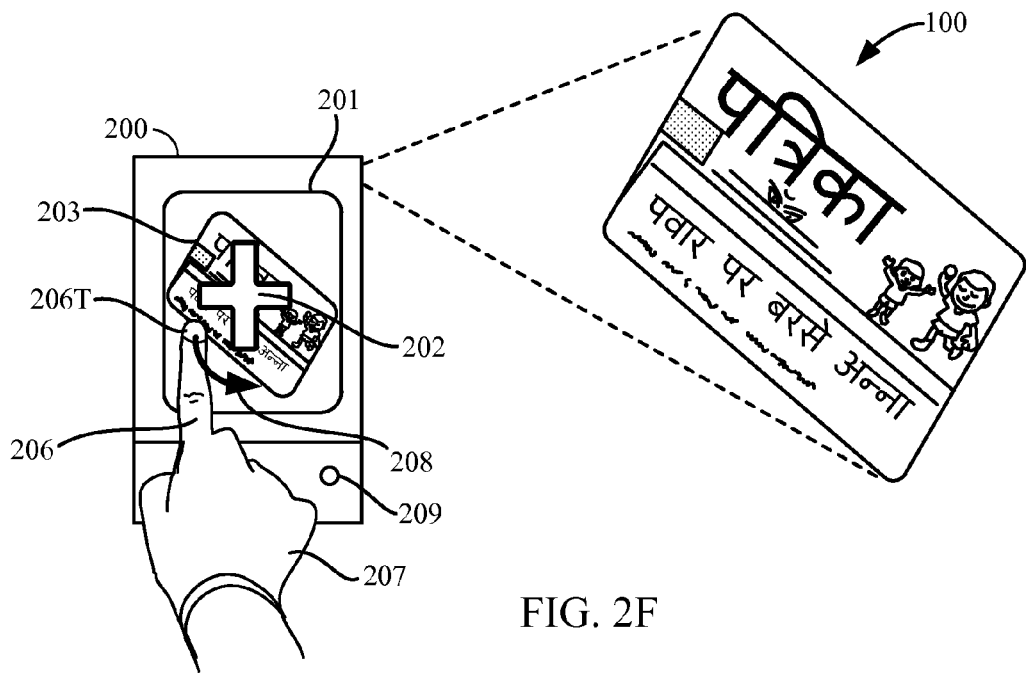
FIG. 2F illustrates certain embodiments wherein a natural image 203 is rotatable on screen 201, by touching and sliding thereon, a tip 205 of a finger 206 of a hand 207 of a user, another rotation movement shown by arrow 208.
Figure 2G:
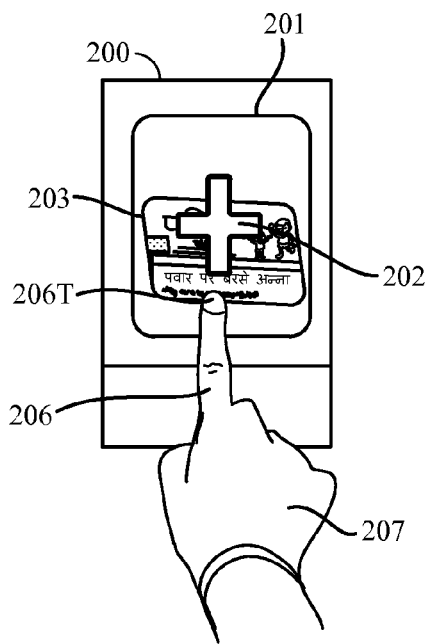
FIG. 2G illustrates image 203 rotated relative to symbol 202 on screen 201 in an anti-clockwise direction shown by arrow 208 in FIG. 2F, to correct skew between symbol 202 and natural image 203.

In another example (see FIG. 2F), an image 203 (which is a natural image, that includes both text and non-text features) is displayed on screen 201 and this image 203 is itself rotatable by moving the tip 206T of finger 206 as shown by arrow 208 in FIG. 2F. At the end of such movement (FIG. 2G), the text in image 203 is aligned relative to symbol 202. Symbol 202 in this example is stationary relative to the four sides (i.e. boundary) of screen 201 of mobile device 200. Hence, after operation 230 (FIG. 2G), mobile device 200 goes to act 231 (described above). Although arrow 208 has been shown in FIGS. 2D and 2F as denoting a rotation movement, a sliding movement may be used in other embodiments, as shown by arrow 208T in FIG. 2H. In the embodiment illustrated in FIG. 2H, although movement shown by arrow 208T is translation, the image 203 is rotated when symbol 202 is displayed on screen 201. Depending on the embodiment, instead of moving an area of touch on a screen, a user may use hand 207 to rotate a knob 209 (or button) as shown in FIG. 2F to provide user input on skew angle, as described above.

Figure 2H:
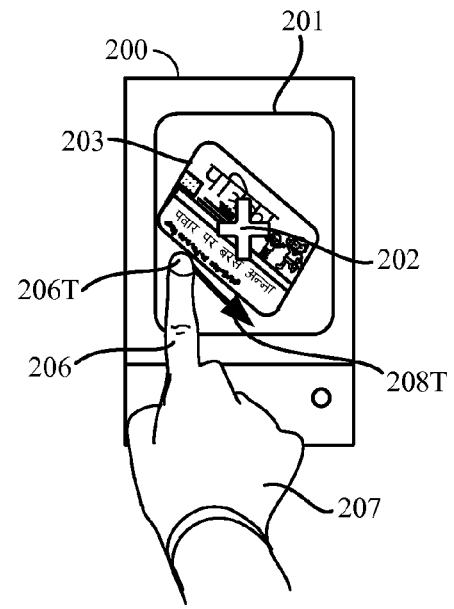
FIG. 2H illustrates a translation movement shown by arrow 208T that is used in some embodiments instead of the rotation movement shown by arrow 208 in FIGS. 2D and 2F.

Accordingly, accuracy in identifying text regions of a natural image (or video frame) is higher when using blocks that do not have skew or whose skew has been corrected, as illustrated in FIGS. 2C, 2E and 2H than the accuracy of prior art methods known to the inventors. For example, accuracy of OCR of block 304 that is skew corrected (FIG. 3B) is higher than the accuracy of OCR of block 302 that has skew present therein (FIG. 3A).

A specific manner in which act 221 (FIG. 2A) is performed is described next for some embodiments, in reference to a formula for the metric $M_i$ of skew shown n a location 303 in memory 1012 (see FIGS. 3A and 3B), as an illustrative example. Specifically, FIG. 3A illustrates a block 302 of an image in memory 1012 (FIG. 6) of some embodiments of mobile device 200, wherein skew computation is performed for a region i by use of the following formula for skew metric $M_i$:

$$M_i = (H_i * W_i)/N_i$$

wherein $H_i$ is the height of the block in number of pixels, e.g. H1 in FIG. 3A, $W_i$ is the width of the block in number of pixels, e.g. W1 in FIG. 2A and hence the numerator is the area of block 302. The denominator of the formula is the number $N_i$ of pixels that have been identified to be included in the region 301 (e.g. in a list of $N_i$ positions of pixels which are binarizable in the block, to a common binary value).

The above-described formula for skew metric $M_i$ is based on an observation that the number $N_i$ of pixels of the region i remains unchanged as an angle of skew is changed, but the area of the block (or minimum bounding rectangle) around the region changes (e.g. the block becomes larger with increasing skew, and the block becomes smaller with decreasing skew or increasing alignment). A value obtained by use of the above formula for skew metric $M_i$ of a region $Q_i$ is then stored in memory 1012 (which is a non-transitory memory) in location 303 therein (FIGS. 3A and 6), followed by detection of presence of large skew, as described above in reference to act 222 of operation 220.

When skew is corrected based on receipt of user input (e.g. sensing of movement of an external object carrying text thereon, such as newspaper 100 or sensing of movement of mobile device 200, or sensing movement of both relative to one another), the same region 301 in a new image (after rotation) may now be contained in a block 304 that is smaller (FIG. 3B), having height H2 and width W2. Note that block width after rotation W2 is slightly larger (e.g. 10% larger) than original width W1, but block height after rotation H2 is significantly smaller (e.g. 30% smaller) than original height H1. Accordingly, although the denominator of the formula for the skew metric $M_i$ is unchanged between FIGS. 3A and 3B, the area after rotation H2*W2 in FIG. 3B is significantly smaller than the original area H1*W1 in FIG. 3A. Therefore, skew metric $M_i$ for block 304 (FIG. 3B) is significantly smaller than the skew metric $M_i$ for block 302 (FIG. 3A).

Figure 3C:
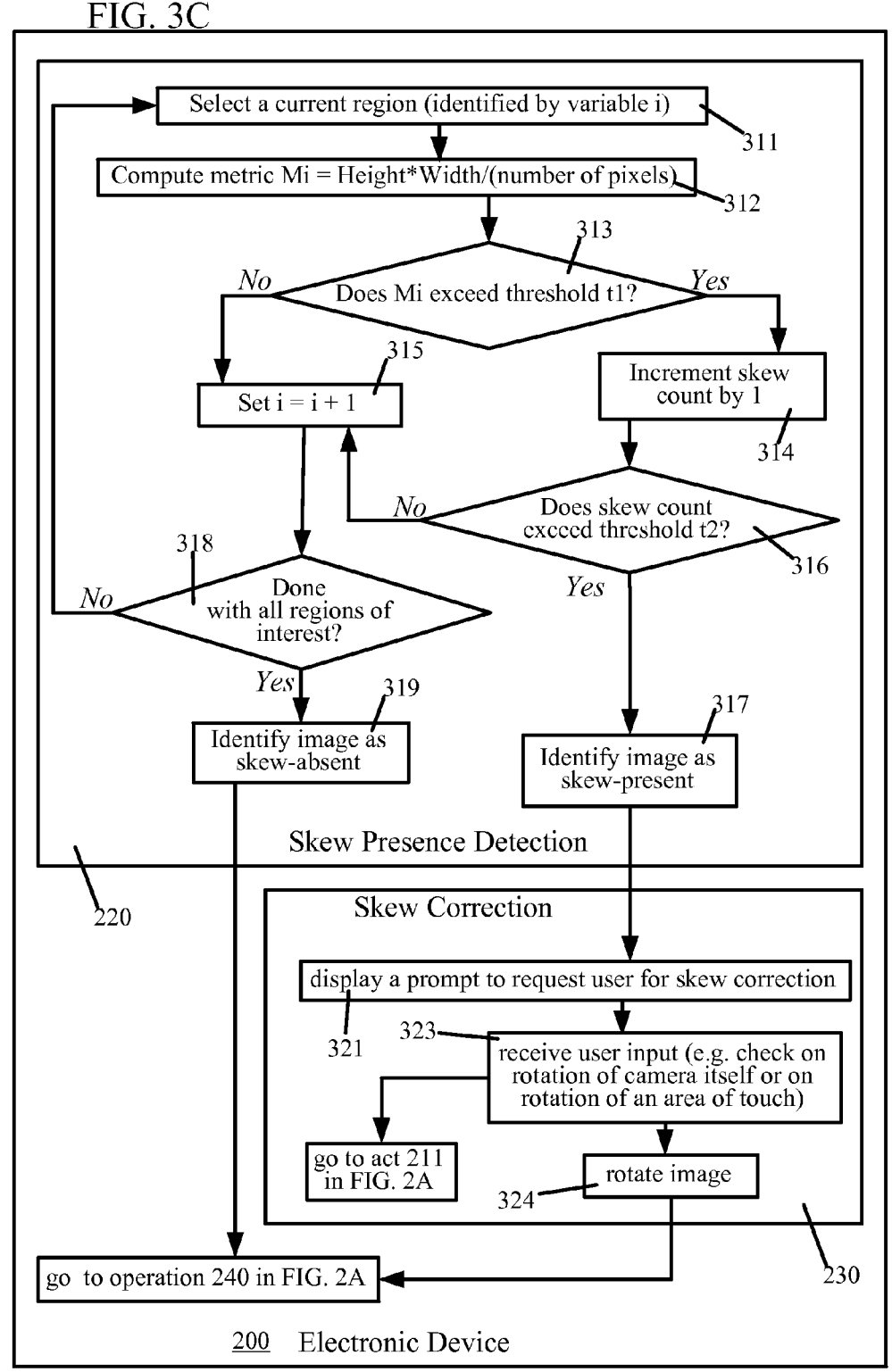
FIG. 3C illustrates, in an intermediate-level flow chart, various acts performed by a mobile device to implement skew metric computation followed by skew correction, in some aspects of the described embodiments.

The above-described skew metric $M_i$ is used in some embodiments to decide whether or not an image has skew, followed by skew correction as illustrated in FIG. 3C. Specifically, after initialization in act 311 to select a region $Q_i$ identified by index "i", in an act 312 skew metric $M_i$ is computed for the region i using the above-described formula. If the region's skew metric $M_i$ exceeds a first threshold t1, a skew count is incremented by 1 in act 314.

Figure 4A:
FIGS. 4A-4D illustrate values of skew metric as computed in certain illustrative aspects of the described embodiments.
Figure 4A:
Figure 4A:
Figure 4A:
Figure 4B:
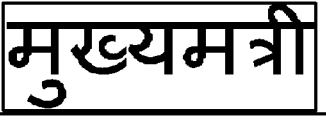
Figure 4B:
Figure 4B:
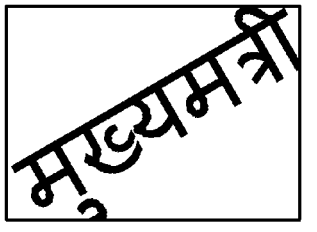
Figure 4B:
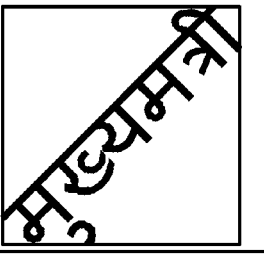
Figure 4C:
Figure 4C:
Figure 4C:
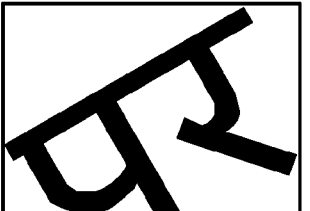
Figure 4C:
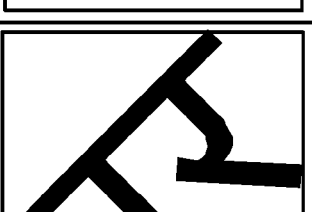
Figure 4D:
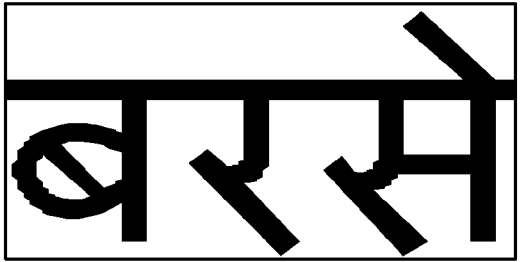
Figure 4D:
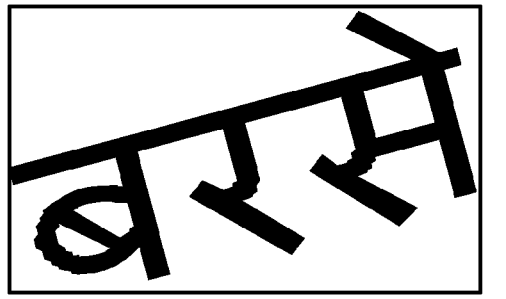
Figure 4D:
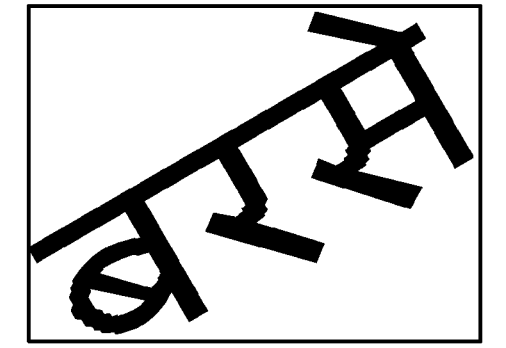
Figure 4D:
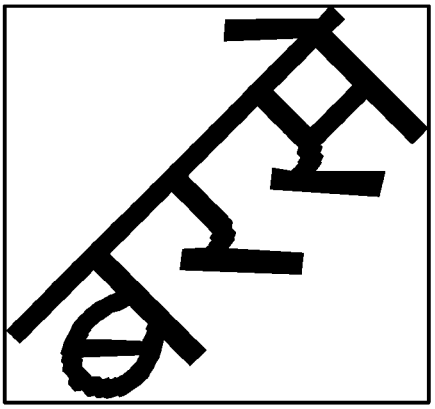

First threshold t1 is predetermined in several embodiments, based on empirical data as follows. Four examples of empirical data are illustrated in FIGS. 4A-4D. The examples shown in FIGS. 4A and 4B are for smaller font sizes relative to the examples shown in FIGS. 4C and 4D. Therefore, for smaller font sizes, threshold t1 is selected to be, for example, value 4, to ensure that the angle of skew is less than 15°. Moreover, for larger font sizes, the threshold t1 may be selected to be, for example, the value 3 again to ensure that the angle of skew is less than 15°.

In several of the above-described examples, first threshold t1 depends on font size, and therefore all regions of an image may be sorted by relative size, followed by use of a median to pick the appropriate threshold t1 (e.g. value 3 for regions of size larger than median and value 4 for regions of size smaller than median).

Referring back to FIG. 3C, act 314 is followed by checking (in act 316) if a skew count exceeds a second threshold t2. The skew count represents the number of regions that are skewed by more than an acceptable amount, e.g. 15° (or even 5° in some embodiments). The second threshold t2 is set by trial and error, e.g. 10% of the total number of regions in an image. In act 316, if skew count does not exceed second threshold t2, control transfers to act 315. Also, when $M_i$ does not exceed first threshold t1, control transfers to act 315.

In act 315 (FIG. 3C), index i is incremented, followed by checking (in act 318) if the skew metric has been calculated for all regions $Q_i$ and if the answer is no, control returns to act 311 to select another region $Q_i$. When the answer in act 318 is yes, then the image is identified as not having skew in act 319, and the image is then processed further in the normal manner (e.g. returning to operation 240, as per FIG. 2A).

In act 316, when the answer is yes, the image is identified as having skew present in an act 317, followed by an operation 230 of skew correction as follows. Specifically, in act 321, mobile device 200 displays on screen 201, a symbol 202 (FIG. 2B) which is indicative of one or more directions and which has been documented in a user manual as being a request for a user to assist in correcting skew, e.g. the "+" sign may be displayed as symbol 202 superimposed on the image. Alternatively, in act 321, mobile device 200 may notify the user via a message, to align the direction of symbol 202 with a direction of text in an image. The message may be displayed on screen 201 (as a symbol 202), or played through a speaker of mobile device 200, or both.

Symbol 202 may be displayed on screen 201 with image 203 in the background, as shown in FIG. 2B. Accordingly, the user may now manually align the object 100 and mobile device 200 to one another, e.g. by rotating the mobile device 200 as illustrated in FIG. 2C and described above (or rotating an area of touch). After act 321, some embodiments perform act 323 (FIG. 3C) to receive user input. In some embodiments, processor 1013 receives user input from a sensor of mobile device 200, in the form of a change of orientation of mobile device 200 and object 100 relative to one another. The sensor that receives user input in act 323 may be different, depending on the embodiment, e.g. a motion sensor 1003 such as an accelerometer (which senses user input by rotation of mobile device 200), or a microphone 1112 (which senses user input via a spoken command to rotate the image, e.g. rotate by a predetermined angle of 1° or 5° depending on the embodiment), or a screen 201 which may be a touch screen (that senses user input by the user's finger moving an area of touch thereon) or any combination thereof. After act 323 (FIG. 3C), processor 1013 returns to act 211 (described above in reference to FIG. 2A), to capture a new image, after the user aligns the object 100 and the mobile device 200.

In certain embodiments, after performance of act 323, mobile device 200 uses the user input to rotate the image relative to screen 201 that is sensitive to touch (or normal screen 1002, depending on the embodiment) as per act 324. As noted above, depending on the embodiment, the user input may be received from a sensor that senses movement of an area of touch on screen 201 of mobile device 200, as the user reduces skew angle by aligning a first direction of a symbol (e.g. "+" sign) relative to a second direction of the image. In this example, the user input is in the form of a signal from a touch screen to a processor 1013 in mobile device 200. Mobile device 200 may use such input (indicative of skew angle) in any manner, e.g. to correct skew in image 203 without physical movement of mobile device 200.

In several embodiments, a skew metric of the type described above is computed after testing a block for presence of a peak in a histogram, e.g. within a specific region of the block (and on finding the test to be satisfied). A histogram of some embodiments is of counts of black pixels (alternatively counts of white pixels), as a function of height of the block.

Presence of the just-described peak in such a histogram of a block typically occurs due to presence in the block of a line pixels of a common binary value (e.g. value 1 for black pixels), which may form a header line in a block that contains text in Hindi language (also called shiro-rekha) written in the Devanagri script (see line 399 in FIG. 3B). Note, however, at this stage the block has not yet been classified as text or non-text. Therefore, such a line of pixels (of a common binary value) may arise from other natural features in an image, such as a light pole. Hence, in some embodiments, a peak may be detected in a profile of a horizontal projection of binarized values of pixels in the block, and a line of pixels in the block may be further tested for being present based on its location e.g. in an upper $\frac{1}{3}^{rd}$ portion of the block, after detection of presence of a line of pixels.

Hence, one or more blocks of an image that are determined to have a line of pixels present therein (e.g. determined by performing a test of the type described in the immediately preceding paragraph) may then be subject to skew metric computation in operation 220, followed by skew correction in operation 230, as described above. As will be readily apparent in view of this disclosure, specific criteria that are used to test for presence of a pixel line that connects multiple characters of text in an image may be different, e.g. depending on the language and script of text to be detected in an image.

Although in some embodiments, skew correction in operation 230 is based on prompting for and receiving user input on tilt, other embodiments (described in the next paragraph, below) automatically search coarsely, followed by searching finely within a coarsely determined range of tilt angle. After automatic skew correction as just described, the skew-corrected blocks are subjected to a merger operation wherein one or more blocks are merged with one another, followed by checking for the presence of a line of pixels in a block 504 (FIG. 6) also called "merged" block that results from merging two or more blocks. In some embodiments, operation 220 to compute a skew metric also identifies presence of a line of pixels, e.g. in an unmerged block.

As noted above, a specific manner in which skew is corrected in operation 230 can be different in different embodiments. In some embodiments, processor 1013 is programmed to automatically detect skew as follows. Processor 1013 checks whether at a candidate angle, one or more attributes of a histogram of counts of pixels of a common binary value meet at least one test for presence of a straight line of pixels. Some embodiments detect a peak of the histogram of a block at the candidate angle by comparing a highest value Np in the counters to a mean Nm of all values in the counters e.g. by forming a ratio therebetween as Np/Nm, followed by comparing that ratio against a predetermined limit (e.g. ratio>1.75 indicates peak).

When a peak is found (e.g. the predetermined limit is exceeded by the ratio), some embodiments of processor 1013 perform an additional test wherein a y-coordinate of the peak is compared with a height of the block to determine whether the peak occurs in an upper 30% of the block. If the additional test is found to be satisfied, in some embodiments of processor 1013 the candidate angle (at which the pixel line is determined to be present) is selected for use in a voting process, and a counter associated with the candidate angle is incremented. Processor 1013 repeats the process described in this paragraph with additional blocks of the image, and after a sufficient number of such votes have been counted (e.g. 10 votes), the candidate angle of a counter which has the largest number of votes is used as the skew angle, which is then used to automatically correct skew in each block (e.g. by rotating each block through negative of the skew angle).

While various examples described herein use Devanagari to illustrate certain concepts, such as detecting a peak as noted above, those of skill in the art will appreciate that these concepts may be applied to languages or scripts other than Devanagari. For example, the peak-location preset criterion for Arabic may be $0.4 \leq Hp/H \leq 0.6$, to test for presence of a peak in a middle 20% region of a block, based on profiles for Arabic text shown and described in an article entitled "Techniques for Language Identification for Hybrid Arabic-English Document Images" by Ahmed M. Elgammal and Mohamed A. Ismail, believed to be published 2001 in Proc. of IEEE 6th International Conference on Document Analysis and Recognition, pages 1100-1104, which is incorporated by reference herein in its entirety. Note that although certain criteria are described for Arabic and English, other similar criteria may be used for text in other languages wherein a horizontal line is used to interconnect letters of a word, e.g. text in the language Bengali (or Bangla). Moreover, embodiments described herein may also be used to detect and correct skew in Korean, Chinese, Japanese, Greek, Hebrew and/or other languages.

Several operations and acts of the type described herein are implemented by a processor 1013 (FIG. 5) that is included in a mobile device 200 capable of identifying blocks of regions in which a straight line of pixels is present, followed by merger of adjacent blocks. Mobile device 200 may include a camera 204 to generate an image or frames of a video of a scene in the real world. Mobile device 200 may further include motion sensors 1003, such as accelerometers, gyroscopes or the like, which may be used to assist in determining the pose of the mobile device 200 relative to object 100 in the real world.

Also, mobile device 200 may additionally include a graphics engine 1004, an image processor 1005, a position processor. Mobile device 200 may also include a disk 1008 to store data and/or software for use by processor 1013. Mobile device 200 may further include a wireless transmitter and receiver circuitry (in circuit 1010) and/or any other communication interfaces 1009. A transmitter in circuit 1010, which may be an IR or RF transmitter or a wireless a transmitter enabled to transmit one or more signals over one or more types of wireless communication networks such as the Internet, WiFi, cellular wireless network or other network.

Note that input to mobile device 200 can be in video mode, where each frame in the video is equivalent to the image input which is used to identify regions, and to compute a skew metric as described herein. Also, the image used to compute a skew metric as described herein can be fetched from a pre-stored file in a memory 1012 of mobile device 200.

It should be understood that mobile device 200 may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of augmented reality (AR).

A mobile device 200 of the type described above may include an optical character recognition (OCR) system as well as software that uses "computer vision" techniques. The mobile device 200 may further include, in a user interface, a microphone and a speaker (not labeled) in addition to screen 201 (which is a touch screen), or normal screen 1002 for displaying captured images. Of course, mobile device 200 may include other elements unrelated to the present disclosure, such as a read-only-memory 1007 which may be used to store firmware for use by processor 1013.

Mobile device 200 of some embodiments includes, in memory 1012 (FIG. 6) a plurality of computer instructions in the form of connected component identifier 1210 that is used in an initialization operation 210 to process an image 107 of a scene of the real world, to generate blocks of regions that are unclassified as text or non-text. Connected component identifier 1210 may implement, for example, any method of identifying MSERs, thereby to generate blocks 302, 304 in memory 1012 (e.g. as lists indicative of corresponding regions, each list including positions of pixels in image 107). Memory 1012 (FIG. 6) further includes computer instructions in the form skew detection and rectification software 181, which in turn includes skew presence detection module 1220, skew correction module 1230, and user interface 181U. In some embodiments, skew presence detection module 1220 (FIG. 6) is implemented by processor 1013 executing computer instructions (also called "first instructions") to compute the values in location 303 (FIG. 3A) of an indicator of skew, for block 302, and block 304, and by processor 1013 executing computer instructions (also called "second instructions") to determine whether skew of the entire image is unacceptable, by applying a predetermined test to the values in location 303 and other similar memory locations (e.g. check whether a count 313 of blocks with unacceptable skew exceeds a threshold).

In several embodiments, skew correction module 1230 (FIG. 6) is implemented by processor 1013 executing computer instructions (also called "third instructions") to request user input to correct skew of the image, in response to skew being found to be unacceptable by skew presence detection module 1220. User interface 181U (FIG. 6) is implemented in some embodiments by processor 1013 executing computer instructions to display on a screen of a mobile device, a symbol "+" superimposed on the image (e.g. by storing both in a frame buffer 559 (FIG. 6) in memory 1012). User interface 181U of several embodiments receives and stores in memory at a location 508, user-input skew angle that aligns a direction of the symbol "+" relative to a direction of the image, and this user-input skew angle is also supplied to skew correction module 1230. Skew correction module 1230 then rotates the regions in blocks 302,304 based on the user-input skew angle, and stores skew-corrected regions in location 509 of memory 1012. The skew-corrected regions are then processed in the normal manner, e.g. positions of pixels in connected components in the blocks are merged with one another by merger software 141, followed by classification as text or non-text by a neural network based classifier 552.

In some embodiments, memory 1012 may include instructions for a classifier that when executed by processor 1013 classifies the blocks 302, 304 that are unmerged (FIG. 6) and/or a block 504 that is merged (stored in memory 1012 by merger software 141) as text or non-text, after binarization based on pixel values in the image to identify connected components therein, and any block classified as text is then supplied to OCR software 551 also executed by processor 1013 of some embodiments.

Depending on the embodiment, various functions of the type described herein may be implemented in software (executed by one or more processors or processor cores) or in dedicated hardware circuitry or in firmware, or in any combination thereof. Accordingly, depending on the embodiment, any one or more of skew presence detection module 1220, skew correction module 1230, and user interface 181U illustrated in FIG. 6 and described above can, but need not necessarily include, one or more microprocessors, embedded processors, controllers, application specific integrated circuits (ASICs), digital signal processors (DSPs), and the like.

The term processor is intended to describe the functions implemented by the system rather than specific hardware. Moreover, as used herein the term "memory" refers to any type of non-transitory computer storage medium, including long term, short term, or other memory associated with a mobile platform, and is not to be limited to any particular type of memory or number of memories, or type of media upon which information (such as merger software 141, skew detection and rectification software 181, and clustering rules 503) may be stored.

Accordingly, in some embodiments, skew presence detection module 1220 implements means for computing a plurality of values of an indicator of skew in a plurality of regions in an image. Moreover, skew presence detection module 1220 of several such embodiments also implements means for determining whether skew of the image is unacceptable, by applying a predetermined test to the plurality of values of the indicator. Furthermore, user interface 181U implements means for requesting user input to correct skew of the image, in response to skew being determined to be unacceptable by the means for determining. Additionally, skew correction module 1230 implements means for correcting skew, based on a user-input skew angle received from user interface 181U. In certain embodiments, a storage module implements means for storing in at least one memory, information related to a skew-corrected block which may be merged with an adjacent block by a block merging module.

Hence, methodologies described herein may be implemented by various means depending upon the application. For example, these methodologies may be implemented in firmware in read-only-memory 1007 (FIG. 6) or software, or hardware or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying computer instructions may be used in implementing the methodologies described herein. For example, merger software 141 and rectification software 181 (FIG. 6) may include program codes stored in memory 1012 and executed by at least one processor, such as processor 1013. Memory 1012 may be implemented within or external to the processor 1013. If implemented in firmware and/or software, the functions may be stored as one or more computer instructions or code on non-transitory computer readable medium. Examples include non-transitory computer readable storage media encoded with a data structure (such as a sequence of images) and non-transitory computer readable media encoded with a computer program (such as merger software 141 and rectification software 181 that can be executed to perform the method of FIGS. 2A and 5).

One or more non-transitory computer readable media include physical computer storage media. A computer readable medium may be any available medium that can be accessed by a computer. By way of example, and not limitation, non-transitory computer readable storage media can comprise RAM, ROM, Flash Memory, EEPROM, CD-ROM or other optical disk storage, magnetic disk storage or other magnetic storage devices, or any other medium that can be used to store program code in the form of software instructions (also called "processor instructions" or "computer instructions") or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of one or more non-transitory computer readable storage media.

Although several aspects are illustrated in connection with specific embodiments for instructional purposes, the present invention is not limited thereto. For example, although mobile device 200 is shown in FIG. 2A of some embodiments, in other embodiments such a device is implemented by use of one or more parts that are stationary relative to a real world scene whose image is being captured by camera 1011. Hence, although mobile device 200 is shown in FIGS. 2B-2H of some embodiments, in other embodiments such a device is implemented by use of form factors that are different, e.g. mobile device 200 in certain embodiments is a mobile platform (such as a tablet) while mobile device 200 in other embodiments is a smart phone, and mobile device 200 in still other embodiments is any electronic device or system (stationary or mobile or any combination thereof). Illustrative embodiments of such an electronic device or system may include multiple physical parts that intercommunicate wirelessly, such as a processor and a memory that are portions of a stationary computer, such as a lap-top computer, a desk-top computer, or a server computer communicating over one or more wireless link(s) with sensors and user input circuitry enclosed in a housing that is small enough to be held in a hand. Various adaptations and modifications may be made without departing from the scope of the described embodiments. Therefore, the spirit and scope of the appended claims should not be limited to the foregoing description.

The invention claimed is:

1. A method to determine skew in an image of a scene in real world, the method comprising:
computing a plurality of values of an indicator of skew in a plurality of regions in the image;
wherein each region in the plurality of regions comprises a plurality of pixels that are contiguous with one another and the region comprises a local extrema of intensity in the image;
determining whether skew of the image is unacceptable, by applying a predetermined test to the plurality of values of the indicator;
wherein a counter in memory is incremented during the determining when a value in the plurality of values exceeds a first threshold, and the predetermined test is met when the counter exceeds a second threshold; and
requesting user input to correct skew of the image, in response to skew being found to be unacceptable by the determining;
wherein one or more of the computing, the determining, and the requesting are performed by at least one processor coupled to said memory.

2. The method of claim 1 wherein:
the value is computed based on at least an area of a minimum bounding rectangle of the region and a count of pixels in the region.

3. The method of claim 2 wherein:
the value is a ratio of the area of the minimum bounding rectangle and the count of pixels in the region.

4. The method of claim 1 wherein:
the requesting comprises displaying on a screen of a mobile device, a symbol superimposed on the image; and
the method further comprises receiving and storing the user input to align a first direction of the symbol relative to a second direction of the image.

5. The method of claim 4 wherein:
the user input is received from the screen, as a measurement of rotation of an area of touch on the screen, the user input being indicative of an angle between the first direction and the second direction.

6. The method of claim 1 further comprising:
receiving the image from a camera in a mobile device;
wherein the computing, the determining and the requesting are performed after passage of at least a predetermined duration of time, from receipt of the image from the camera.

7. The method of claim 1 further comprising:
receiving the image from a camera in a mobile device, prior to the computing;
checking whether the camera has been rotated relative to the scene, subsequent to the requesting; and
returning to the receiving, in response to finding by the checking that the camera has been rotated.

8. The method of claim 1 wherein:
the computing, the determining and the requesting are performed prior to classification of the region as text or non-text.

9. A mobile device comprising:
a camera;
a memory operatively connected to the camera to receive at least an image therefrom;
at least one processor operatively connected to the memory to execute a plurality of computer instructions stored in the memory, to compute a plurality of values of an indicator of skew in a plurality of regions in the image;
wherein each region in the plurality of regions comprises a plurality of pixels that are contiguous with one another and the region comprises a local extrema of intensity in the image;
wherein the plurality of computer instructions when executed cause the at least one processor to determine whether skew of the image is unacceptable, by applying a predetermined test to the plurality of values of the indicator;
wherein the plurality of computer instructions when executed cause the at least one processor to increment a counter in the memory when a value in the plurality of values exceeds a first threshold and wherein the predetermined test is met when the counter exceeds a second threshold: and
wherein the plurality of computer instructions when executed cause the at least one processor to request a user input to correct skew of the image, in response to skew being determined to be unacceptable by the at least one processor.

10. The mobile device of claim 9 wherein:
the value is computed based on at least an area of a minimum bounding rectangle of the region and a count of pixels in the region.

11. The mobile device of claim 10 wherein:
the value is a ratio of the area of the minimum bounding rectangle and the count of pixels in the region.

12. The mobile device of claim 9 wherein the plurality of computer instructions when executed cause the at least one processor to:

display on a screen, a symbol superimposed on the image; and receive and store the user input to align a first direction of the symbol relative to a second direction of the image.

13. The mobile device of claim 12 wherein:
the user input is received from the screen, as a measurement of rotation of an area of touch on the screen, the user input being indicative of an angle between the first direction and the second direction.

14. One or more non-transitory computer readable storage media comprising computer instructions, which when executed in a handheld device, cause one or more processors in the handheld device to perform operations, the computer instructions comprising:
first instructions to compute a plurality of values of an indicator of skew in a plurality of regions in an image;
wherein each region in the plurality of regions comprises a plurality of pixels that are contiguous with one another and the region comprises a local extrema of intensity in the image;
second instructions to determine whether skew of the image is unacceptable, by applying a predetermined test to the plurality of values of the indicator;
wherein the second instructions when executed cause the one or more processors to increment a counter in memory when a value in the plurality of values exceeds a first threshold and wherein the predetermined test is met when the counter exceeds a second threshold; and
third instructions to request user input to correct skew of the image, in response to skew being determined to be unacceptable.

15. The one or more non-transitory computer readable storage media of claim 14 wherein:
the value is computed based on at least an area of a minimum bounding rectangle of the region and a count of pixels in the region.

16. The one or more non-transitory computer readable storage media of claim 15 wherein:
the value is a ratio of the area of the minimum bounding rectangle and the count of pixels in the region.

17. A mobile device for processing an image, the mobile device comprising:
a memory storing the image, wherein the image is of an environment outside the mobile device;
means for computing a plurality of values of an indicator of skew in a plurality of regions in the image;
wherein each region in the plurality of regions comprises a plurality of pixels that are contiguous with one another and the region comprises a local extrema of intensity in the image;
means for determining whether skew of the image is unacceptable, by applying a predetermined test to the plurality of values of the indicator;
wherein the means for determining increment a counter in the memory when a value in the plurality of values exceeds a first threshold and wherein the predetermined test is met when the counter exceeds a second threshold; and
means for requesting user input to correct skew of the image, in response to skew being determined to be unacceptable by the means for determining.

18. The mobile device of claim 17 wherein:
the value is computed based on at least an area of a minimum bounding rectangle of the region and a count of pixels in the region.

19. The mobile device of claim 18 wherein:
the value is a ratio of the area of the minimum bounding rectangle and the count of pixels in the region.

* * * * *